United States Patent [19]
Walker

[11] Patent Number: 5,734,341
[45] Date of Patent: Mar. 31, 1998

[54] ENCODING DIGITAL DATA

[75] Inventor: Christopher Paul Hulme Walker, Portishead, United Kingdom

[73] Assignee: SGS-Thomson Microelectronics Limited, Bucks, United Kingdom

[21] Appl. No.: 743,417

[22] Filed: Nov. 1, 1996

Related U.S. Application Data

[63] Continuation of Ser. No. 259,522, Jun. 10, 1994, abandoned.

[30] Foreign Application Priority Data

Jun. 11, 1993 [GB] United Kingdom ............... 9312124

[51] Int. Cl.[6] .................................................. H03M 7/00
[52] U.S. Cl. ............................................. 341/95; 341/58
[58] Field of Search ............................ 341/58, 59, 95, 341/100, 101, 102

[56] References Cited

U.S. PATENT DOCUMENTS 3,921,210  11/1975  Halpern ................................ 341/58
4,020,282   4/1977  Halpern ................................ 341/58

FOREIGN PATENT DOCUMENTS

| 0 066 512 | 12/1982 | European Pat. Off. ......... G11B 5/09 |
| 0 143 268 |  6/1985 | European Pat. Off. |
| 54-108433 |  8/1979 | Japan. |
| 59-264048 | 12/1984 | Japan. |
| 2-189286  |  7/1990 | Japan. |
| 2041702   |  9/1980 | United Kingdom. |

*Primary Examiner*—Marc S. Hoff
*Attorney, Agent, or Firm*—David V. Carlson; Seed and Berry LLP

[57] ABSTRACT

An encoding scheme relies on a d.c. balanced code wherein each message to be transmitted is sent as a plurality of symbols, each symbol having six bits, three ones and three zeros. Out of the twenty combinations of balanced six-bit codes, two codes are reserved to operate as control tokens, being 010101 and 101010. Because of the particular format of the symbols, control tokens can be easily detected. Furthermore, they can be combined in longer bit sequences for use as initialization and disconnect sequences.

19 Claims, 23 Drawing Sheets

FIG. 5a  DATA
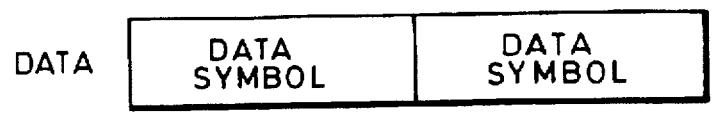
FIG. 5b  END OF PACKET (EOP)
FIG. 5c  END OF MESSAGE (EOM)
FIG. 5d  FLOW CONTROL (FCT)

FIG. 5e

IDLE: CONTROL SYMBOL | CONTROL* SYMBOL

FIG. 5f

INITIALISE: CONTROL SYMBOL | CONTROL* SYMBOL | CONTROL* SYMBOL | CONTROL* SYMBOL

FIG. 5g

RESERVED: CONTROL SYMBOL | CONTROL* SYMBOL | CONTROL* SYMBOL | DATA SYMBOL

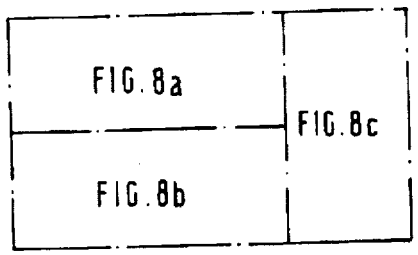
*FIG. 8*
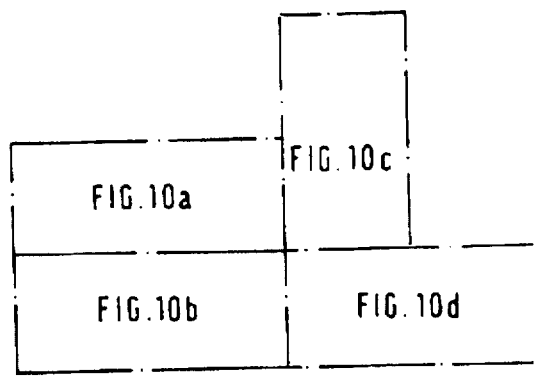
*FIG. 10*
*FIG. 10c*
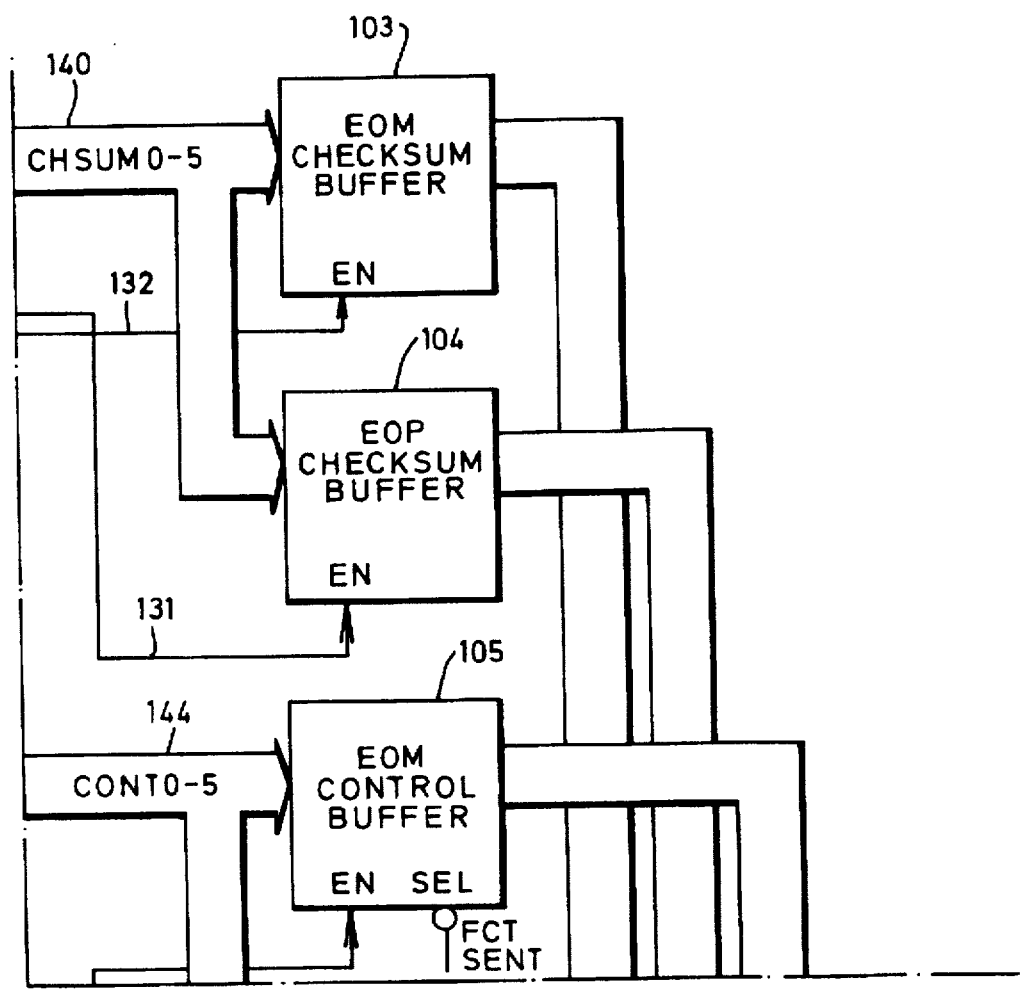

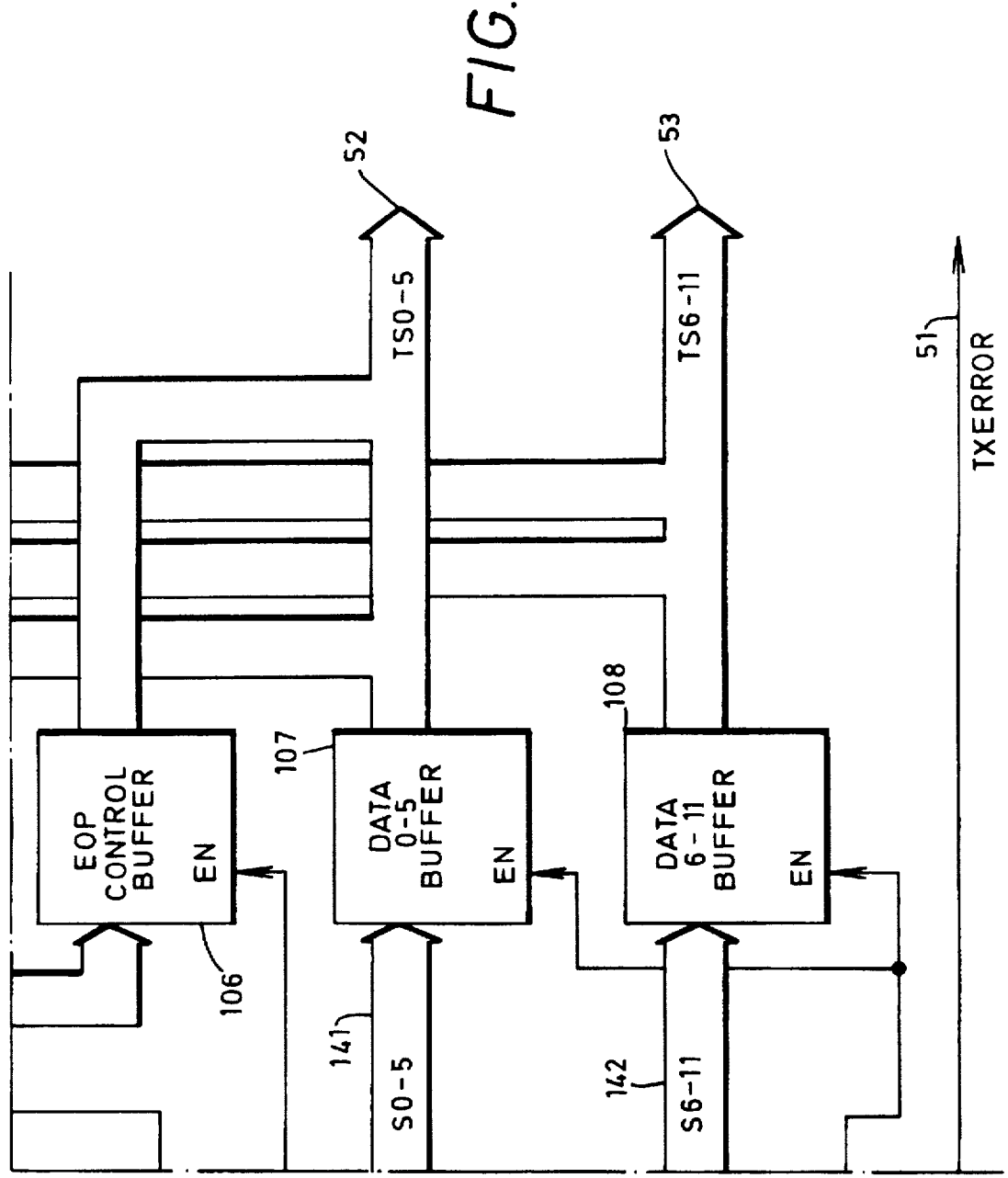

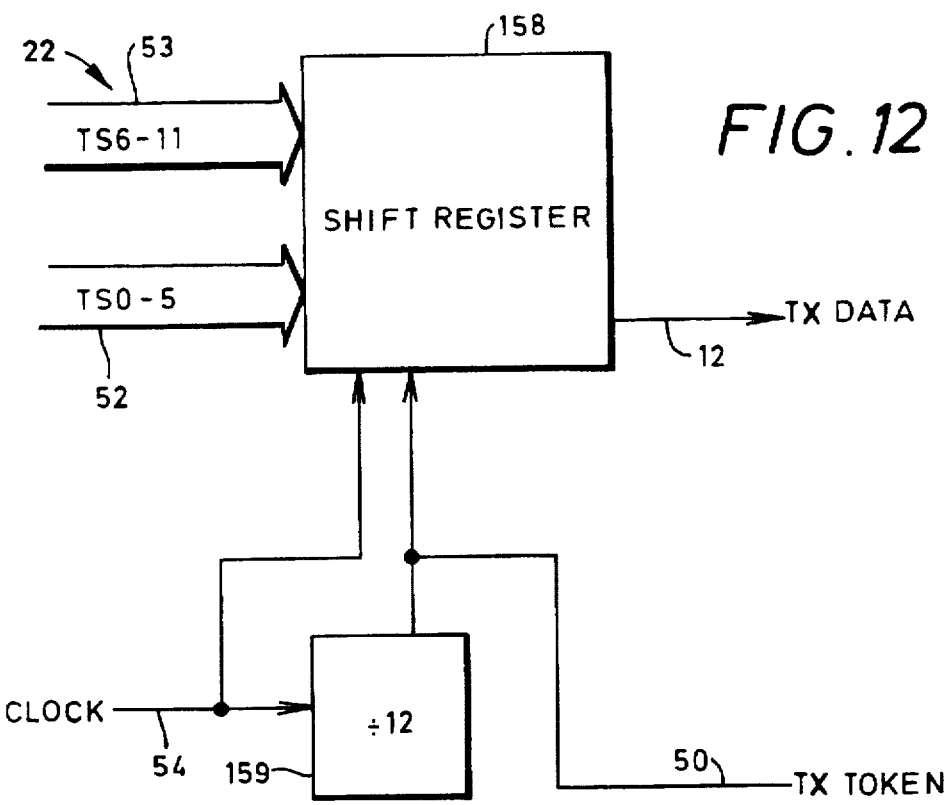
FIG. 12
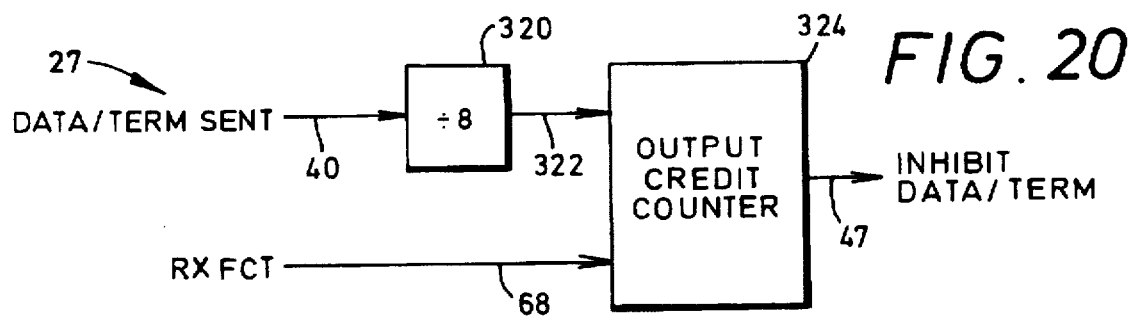
FIG. 20
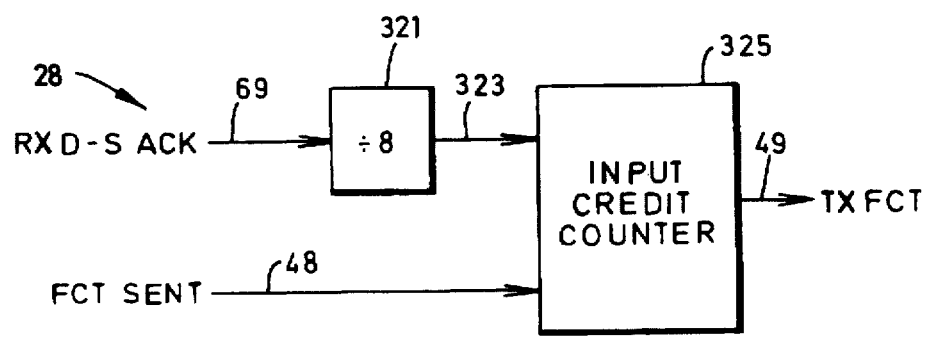

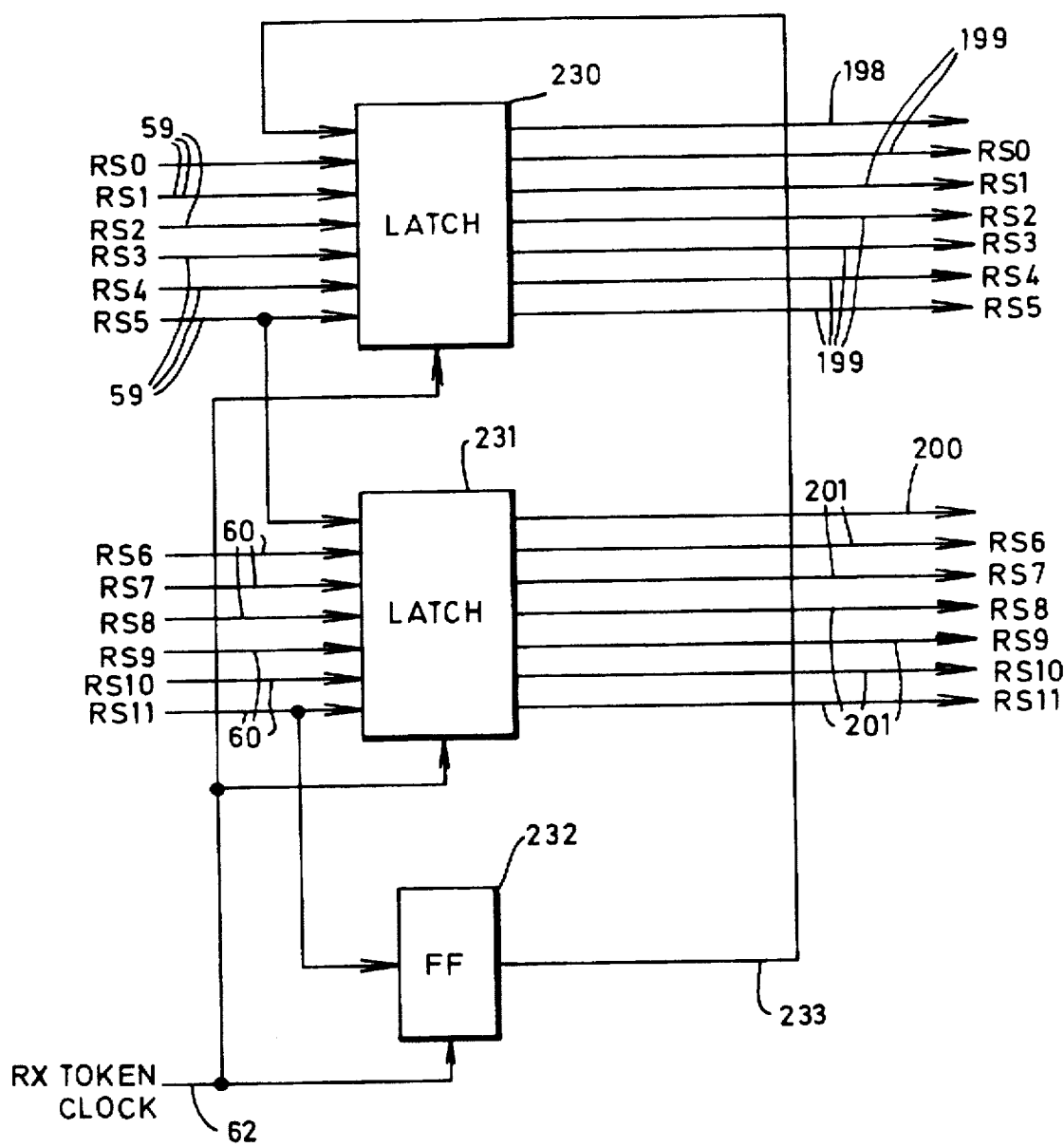

1

ENCODING DIGITAL DATA

CROSS-REFERENCE TO RELATED APPLICATION

This application is a continuation of U.S. patent application Ser. No. 08/259,522, filed Jun. 10, 1994, now abandoned.

CROSS-REFERENCES TO RELATED APPLICATIONS

The present application is related to the following copending United States applications:

"Transmission of Messages," invented by Christopher Paul Hulme Walker, U.S. Ser. No. 08/259,521, filed on Jun. 10, 1994, previously filed in Great Britain and as British Patent Application No. 9312136.6 (Seed & Berry Attorney Docket No. 858063.404).

"Encoding Scheme," invented by Christopher Paul Hulme Walker, U.S. Ser. No. 08/259,523, filed on Jun. 10, 1994, and having been previously filed in Great Britain and being identified by British Patent Application No. 9312071.5 (Seed & Berry Attorney Docket No. 858063.405).

"Generation of Checking Data," invented by Christopher Paul Hulme Walker, U.S. Ser. No. 08/258,979, filed on Jun. 10, 1994, and having been previously filed in Great Britain and being identified by British Patent Application No. 9312135.8 (Seed & Berry Attorney Docket No. 858063.407).

"Communication Interface," invented by Robert J. Simpson, U.S. Ser. No. 07/705,186, filed on May 24, 1991.

Each of the above-identified copending patent applications is incorporated herein by reference.

Additionally, European Patent Application No. 91304711.4 is also incorporated herein by reference. This application describes a data/strobe message format.

FIELD OF THE INVENTION

The present invention relates to method and apparatus for encoding digital data, particularly for transmission using optical fibre links or a.c. coupled copper cable. The invention is concerned particularly with providing an encoding scheme suitable for the transmission of messages made up of short packets.

The invention is particularly concerned with transmitting messages between computers connected by a transmission link with each computer having a link interface for receiving messages from the computer, encoding them and transmitting the encoded data. The link interface is also arranged to receive encoded data, decode it and provide messages to the computer.

BACKGROUND OF THE INVENTION

Messages are generally generated as a plurality of packets. Each packet can include a header or address portion which will comprise one or more data tokens, a data portion comprising one or more data tokens and a terminator token as an end of packet indicator. Where the packet is the last packet in a message, the end of packet indicator is replaced by an end of message indicator. Some packets contain no data portion.

Each data token comprises a flag bit, a parity bit and 8 bits of data. Each terminator token comprises a flag bit, a parity bit and two control bits.

SUMMARY OF THE INVENTION

The present invention uses a code for encoding data tokens and terminator tokens into symbols for transmission which are d.c. balanced, that is within each symbol there is an equal number of ones and zeros. D.c. balanced codes serve to minimise the bandwidth for transmission of encoded data. Reference is made to EP-0066512 which discloses a d.c. balanced code where each symbol has twenty bits, and which is intended to be balanced over a transmission. Reference is also made to IBM Technical Disclosure Bulletin, Vol. 22, No. 8b, January 1980 pages 3547 to 3550 which discloses a d.c. balanced code wherein each symbol comprises six bits, three ones and three zeros. EP-0405990 in the name of the present Applicant also describes a 3-of-6 coding system.

A 3-of-6 code has particular advantages. Firstly, each symbol is short, consisting only of six bits and is balanced within itself (i.e., it has three ones and three zeros). Furthermore, as there are twenty combinations of balanced six bit codes, the code is particularly suitable for encoding groups of four bits of incoming data, since four input bits involve only sixteen unique combinations. Thus, four six-bit combinations are potentially available for control purposes.

The present invention provides an improved 3-of-6 encoding system relying on the selection of particular six-bit symbols as control symbols.

According to one aspect of the present invention there is provided a method of generating control tokens in a message transmission system wherein each message includes at least one data token comprising a plurality of four bit values and at least one terminator token in a first format, the method comprising:

encoding each four bit value into a second format as a six bit symbol having three ones and three zeros, each symbol being selected out of a set of sixteen symbols assigned exclusively as data symbols and excluding the symbols 010101 and 101010, and generating control tokens in the second format using the control symbols 010101 and 101010.

The symbol 010101 is preferably allocated as a first control symbol and the symbol 101010 is then allocated as a second control symbol. The selection of a particular one of the first and second control symbols can then be made in dependence on the value of the last bit of the preceding symbol. Thus, the first bit of a first type of control symbol can match the last bit of the preceding data symbol while the first bit of a second type of control symbol is the logical inverse of the last bit of the preceding data symbol. The formation of control tokens can take advantage of this feature so that each control token can begin with a control symbol of the first type. In that case, it is guaranteed that there will be no transition between the last bit of the preceding symbol and the first symbol of the control token. This criteria enables different types of control tokens to be formed using only the symbols 010101 and 101010.

Thus, the following control tokens can be formed:

| | |
|---|---|
| end of packet (EOP) | first type of control symbol followed by a data symbol; |
| end of message (EOM) | data symbol followed by a first type of control symbol; |
| flow control token (FCT) | first type of control symbol followed by first type of control symbol; |
| idle (IDLE) | first type of control symbol followed by second type of control symbol; |
| initialise | first type of control symbol followed by three control symbols of the second type in succession. |

End of packet and end of message tokens are used to encode end of packet and end of message indicators on incoming messages, referred to herein as terminators. The remaining control tokens are used to provide various control functions between the link interfaces.

A flow control token is used to control the flow of terminator and data between transmitting and receiving interfaces. The idle and initialise tokens each comprise sequences of successively alternating bits. The idle token is a sequence of twelve bits and the initialise token is a sequence of twenty-four alternating bits. These tokens can be used for the purposes of recovering a clock and checking for synchronisation in the receiving interface.

Thus, the present invention also provides data receiving circuitry including a synchronisation detection circuit comprising a clock generator connected to receive an incoming stream of bits and to generate therefrom a bit clock having a clock edge defining each bit position in the bit stream, a counter arranged to receive the incoming bit stream and the bit clock and to count the number of successive transitions in the incoming bit stream and to provide a first output signal when the count is twelve, a clock divider for dividing the bit clock by twelve to produce a second output signal every twelfth clock edge and phase detecting means for comparing said first and second output signals and for providing an error signal when they are out of phase.

The synchronisation detection circuit can also comprise an initialisation detector in the form of a second counter arranged to receive said bit stream and said bit clock and to provide a start signal on counting twenty-three successive transitions said start signal being supplied to said first counter.

The provision of idle and initialise tokens having a plurality of successive transitions (12 and 24 respectively) is ideally suited to maintaining synchronisation and providing sufficient transitions for clock recovery. Furthermore, each initialisation sequence of twenty-four bits is separated from the next by a lack of transition which further assists in maintaining token synchronisation.

The selection of these particular control symbols also has the advantage they can be used in different combinations to define various control tokens which are however each 12 bits long and thus match the number of bits required to encode each data byte. Thus, apart from initialisation and disconnect sequences the token length of encoded data and control information is always the same.

The present invention also provides data transmission circuitry comprising:

input means for receiving messages in a first format including data tokens represented by four bit values and terminator tokens;

encoding circuitry for encoding each four bit value as a six bit symbol having three ones and three zeros, each symbol being selected out of a set of sixteen symbols uniquely assigned as data symbols and excluding the symbols 010101 and 101010 and for generating control tokens using the symbols 010101 and 101010; and output means for transmitting the encoded data symbols and generated control tokens.

Preferably the input means comprises a buffer arranged to receive bits of an incoming token in parallel, the encoding means providing for each incoming token two six-bit symbols and outputting the bits of these symbols in parallel and the transmitting means comprising a parallel to serial converter for transmitting the bits of the encoded symbols serially.

As an example, the incoming token can comprise eight data bits, one parity bit and one flag bit identifying whether or not the data bits are representative of data values or are terminator bits. Where they are terminator bits, generally only two control bits will be present. With the present encoding scheme there is no need to transmit the parity bits or flag bits, since each six-bit symbol which has been used to encode four bit values includes two redundant bits which can be used to generate parity for the symbol, and the control tokens are uniquely identifiable being 101010 or 010101.

Where the transmitting circuitry and receiving circuitry are arranged together in an interface, flow control means can be provided to control the output and input flows of symbols.

For a better understanding of the present invention and to show how the same may be carried into effect reference will now be made by way of example to the accompanying drawings.

BRIEF DESCRIPTION OF THE DRAWINGS

FIGS. 5a to 5g are representations of tokens in 3-of-6 format.

FIGS. 8 and 8a–8c are a block diagram of each receiving and transmitting circuit.

FIGS. 10 and 10a–10d are a circuit diagram of a data/control token symbol generator.

FIG. 12 is a circuit diagram of a parallel-to-serial converter.

FIG. 15 is a circuit diagram of an input latch for the receive decode circuit.

FIG. 20 is a circuit diagram of a flow control circuit.

DESCRIPTION OF THE PREFERRED EMBODIMENT

Figure 1:
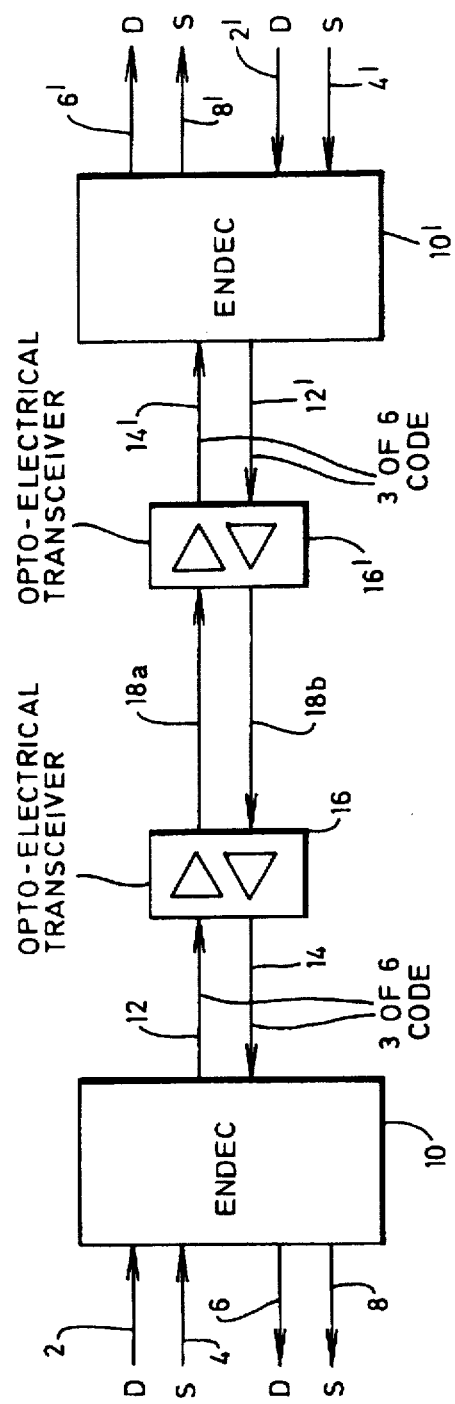
FIG. 1 is a block diagram of receiving and transmitting circuits.

FIG. 1 is a block diagram of basic circuitry for implementing the present invention to encode and decode messages. Reference numerals 2 and 4 denote a first parallel pair of unidirectional wires forming respectively a data signal path and a parallel strobe signal path. Reference numerals 6 and 8 denote a second parallel pair of unidirectional wires forming respectively a data signals path and a strobe signal path in the opposite direction. The parallel pairs of wires carry data and strobe information as described in our copending application Ser. No. 07/705,186, filed on May 24, 1991, now U.S. Pat. No. 5,341,371 the contents of which are herein incorporated by reference, in which the strobe signal has a transition for each bit boundary for which there is no transition in the data signal, and no transition for each bit boundary where there is a transition in the data signal. Reference numeral 10 denotes an encoder/decoder which serves to encode the data-strobe signals into a format suitable for transmission by a single wire 12 and to decode from that format on a single wire 14 back into the data-strobe signals. Reference numeral 16 denotes an optoelectrical transceiver which converts the encoded format 12 into optical signals for transmission down an optical fibre which has an outgoing link 18a. The optoelectrical transceiver 16 also converts optical signals carrying the incoming coded format on link 18b to electrical format on wire 14 suitable for input to the encoder/decoder 10. The circuitry described is at one end of an optical fibre link for receiving and transmitting data. The right hand side of FIG. 1 shows identical receiving/transmitting circuitry at the other end of the optical link 18a, 18b.

Figure 2:
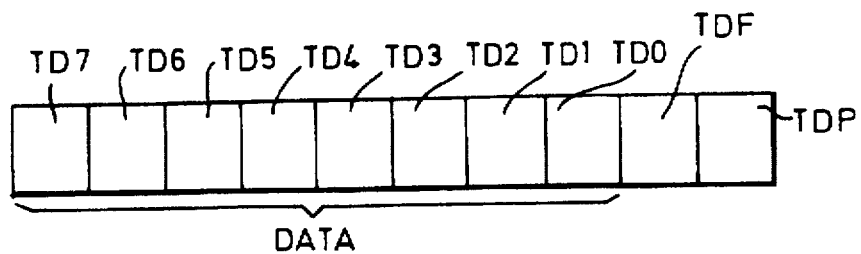
FIGS. 2 to 4 are representations of tokens in data-strobe format.

In the data strobe format, basic information is transmitted in the form of tokens, which can be data tokens or control tokens. A packet comprises at least two tokens, and may include several tokens. A message comprises at least one packet and may include several packets. As shown in FIG. 2, data tokens each comprise 8 bits of data TD0–TD7, one flag bit, TDF, to indicate it is a data token and a parity bit, TDP.

Figure 3:
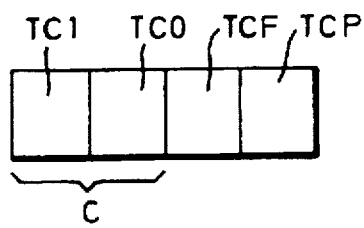
Figure 4:
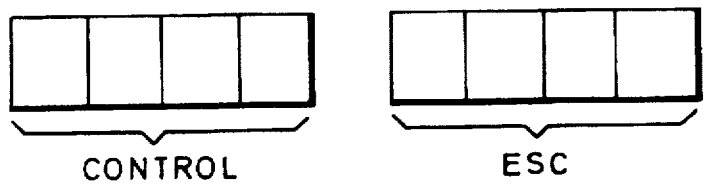

As shown in FIG. 3, control tokens each comprise one flag bit TCF to indicate it is a control token, a parity bit TCP and two control bits TC1, TC0 to indicate the type of control token. One particular control token denotes an escape (ESC) token. An ESC token is followed by a further control token to provide compound tokens to increase the number of available control tokens (see FIG. 4). In the data strobe format, therefore, different tokens can be ten, four or eight bits long. There are two basic types of control tokens: those denoting an end of packet or end of message and referred to herein as terminator tokens, and those controlling transmission of data. Terminator tokens are encoded but the remaining control tokens are not.

The transmission format described herein is a so-called 3-of-6 code, in which tokens are made up of symbols, each symbol having six bits, three of which are ones and three of which are zeros. Thus the code is d.c. balanced, and hence the signal bandwidth is minimised. A narrow signal bandwidth has the advantage of improving both signal transmission and amplification. The encoding system described herein encodes each data strobe token (data or terminator) into two 3-of-6 symbols (to form a 12 bit data or terminator token). Thus, in the 3-of-6 code, the length of a token does not vary—it is always 12 bits. There are some 24 bit tokens for particular cases which are described later, but these can be considered as particular combinations of two 12 bit tokens. FIG. 5 denotes various 3-of-6 encoded tokens which can be sent. In FIG. 5, "data" denotes a 3-of-6 data symbol and "control" denotes a 3-of-6 control symbol. As explained below, these are readily distinguishable.

FIG. 5a shows a data token, which is a 3-of-6 data symbol followed by another 3-of-6 data symbol.

FIG. 5b illustrates an end of packet (EOP) control token which is a control symbol followed by a data symbol.

FIG. 5c shows an end of message (EOM) control token which is a data symbol followed by a control symbol. EOP and EOM tokens can be referred to as terminator tokens.

FIG. 5d illustrates a flow control (FCT) token which is a control symbol followed by another control symbol.

FIG. 5e denotes an idle token which is a control symbol followed by a control* symbol. The difference between a control symbol and a control* symbol will be described hereinbelow.

FIG. 5f denotes a 24 bit initialise token which is one control symbol followed by three control* symbols.

FIG. 5g illustrates a 24 bit reserved token which is a control symbol followed by two control* symbols and a data symbol.

Selection of Data Symbols

One aspect of the present encoding scheme is concerned with the selection of particular 3-of-6 symbols to encode particular data-strobe (D-S) data and control information. There are twenty possible six bit combinations which have equal numbers of ones and zeros. The symbols 000111 and 111000 are not used because they increase the run length and total disparity count or digital sum variation (DSV) of the code. The DSV is the count of the number of more ones than zeros, or vice versa, that have been transmitted since the start of transmission. It is an inherent property of the balanced 3-of-6 code that any symbol which has four or more ones or four or more zeros will be illegal. Further, if in transmission the disparity count should exceed 2, or the run length should exceed 4, such a disparity or run length is considered illegal, and an error is flagged. It should be noted that a run length equal to four may be legal if it occurs symmetrically across the boundary between two symbols.

Of the remaining eighteen symbols, the symbols 101010 and 010101 are selected to be used as control symbols. The following Table 1 shows how the sixteen data symbols are selected for the Hex values 0 to F.

TABLE 1

| Hex value | Binary value lsb msb p q r s | 3 of 6 code symbol |   |   |   |
|---|---|---|---|---|---|
|   |   | lsb t u | -y- | v w | msb -z- |
| 0 | 0 0 0 0 | 0 1 | 1 | 0 1 | 0 |
| 1 | 1 0 0 0 | 1 0 | 1 | 0 0 | 1 |
| 2 | 0 1 0 0 | 0 1 | 1 | 0 0 | 1 |
| 3 | 1 1 0 0 | 1 1 | 0 | 0 0 | 1 |
| 4 | 0 0 1 0 | 0 0 | 1 | 1 0 | 1 |
| 5 | 1 0 1 0 | 1 0 | 1 | 1 0 | 0 |
| 6 | 0 1 1 0 | 0 1 | 1 | 1 0 | 0 |
| 7 | 1 1 1 0 | 1 1 | 0 | 1 0 | 0 |
| 8 | 0 0 0 1 | 0 0 | 1 | 0 1 | 1 |
| 9 | 1 0 0 1 | 1 0 | 0 | 0 1 | 1 |
| A | 0 1 0 1 | 0 1 | 0 | 0 1 | 1 |
| B | 1 1 0 1 | 1 1 | 0 | 0 1 | 0 |
| C | 0 0 1 1 | 0 0 | 1 | 1 1 | 0 |
| D | 1 0 1 1 | 1 0 | 0 | 1 1 | 0 |
| E | 0 1 1 1 | 0 1 | 0 | 1 1 | 0 |
| F | 1 1 1 1 | 1 0 | 0 | 1 0 | 1 |

The left hand column denotes the Hex value with the next column denoting its four bit representation in binary p being the least significant bit and s the most significant bit. The right hand column denotes the 3-of-6 data symbol for that value, with the bits reading from left to right, with "t" being the least significant bit and "z" being the most significant bit. This particular selection of symbols satisfies several criteria. Firstly, the illegal symbols (000111, 111000) and control symbols (010101, 101010) are not used. Secondly, each symbol is distinct from the others. Thirdly, the coding scheme is strongly systematic. That is, for all of the values except Hex0 and HexF four bits in the 3-of-6 code (tuvw) are the same as the four bits (pqrs) of the binary representation of the Hex value. This simplifies considerably the logic required for encoding and decoding which can be represented as shown in the following Table 2:

TABLE 2

$\bar{z} = (\bar{p}^*r^*s) + (\bar{q}^*r^*s) + (p^*r^*\bar{s}) + (q^*r^*\bar{s}) + (p^*q^*\bar{r}^*s) + (\bar{p}^*\bar{q}^*\bar{r}^*\bar{s})$
$w = (\bar{p}^*s) + (\bar{r}^*s) + (\bar{q}^*s) + (\bar{p}^*\bar{q}^*\bar{r})$
$v = r$
$y = (\bar{p}^*\bar{s}) + (\bar{q}^*\bar{s}) + (\bar{p}^*\bar{q})$
$u = (\bar{p}^*q) + (q^*\bar{s}) + (q^*\bar{r}) + (\bar{p}^*\bar{r}^*\bar{s})$
$t = p$ This includes the generation of y and z, which are generated to satisfy the balanced requirement of the symbol (i.e., three ones, three zeros) to avoid illegal symbols and to enable them to be used to generate a parity bit when decoding back into the data-strobe format. A parity bit can be generated as the result of an exclusive OR function carried out on the generated bits y and z for the two symbols in each token. This will be described in more detail hereinbelow. This parity bit can be modified to generate a data-strobe parity bit. No extra parity bit is required to be transmitted since it can be generated from each symbol. Thus, this particular format for encoding four bit values into 3-of-6 symbols has several advantages.

Use of Control Signals

As explained above, there are two 3-of-6 symbols reserved as control symbols, 010101 and 101010. The use of these symbols will now be described with reference to FIGS. 5 and 6. In FIG. 5, some symbols are denoted "control" and some are denoted "control*". These denotations govern the sequence of bits of control symbols used in any particular case, in dependence on the last bit of the preceding symbol. The rules are set out below and illustrated in FIG. 6.

Figure 6A:
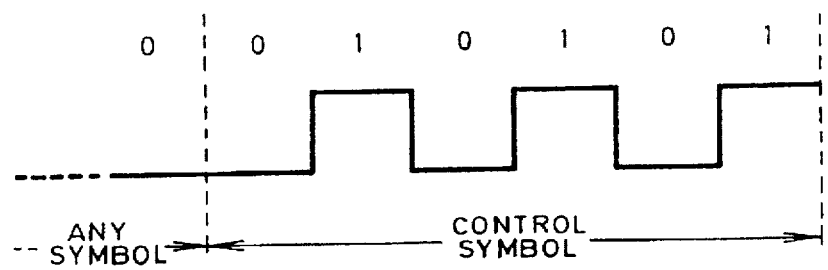
FIGS. 6a to 6d are bit representations of particular combinations of control symbols.
Figure 6B:
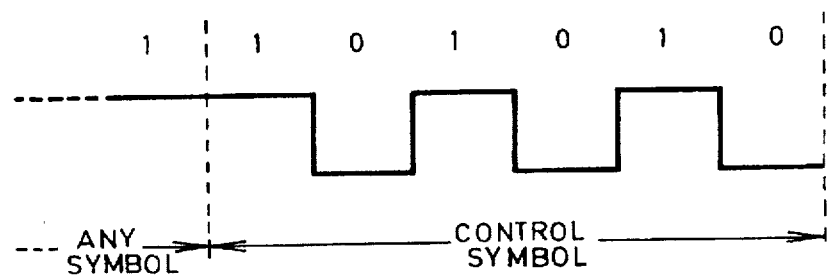

If the last bit of the previous symbol was zero, the first bit of the control symbol is also zero (FIG. 6a). If the last bit of the previous symbol was one, the first bit of the control symbol is also one (FIG. 6b).

For these cases, there is no transition between the symbols of the token.

Figure 6C:
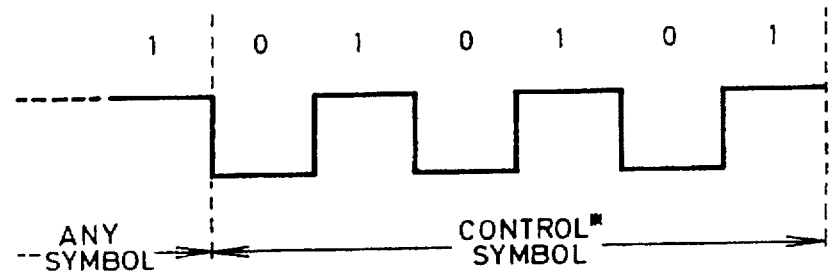
Figure 6D:
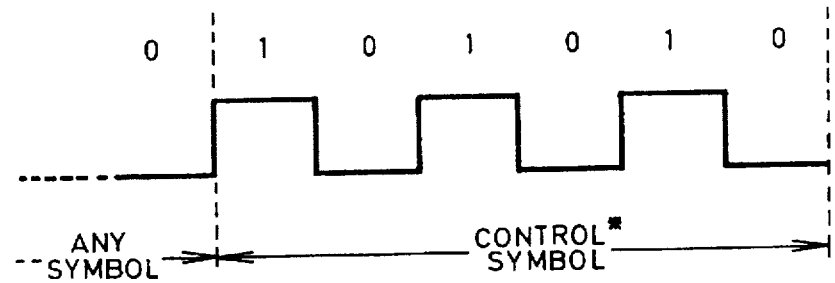

If the last bit of the previous symbol was one, the first bit of the control* symbol is zero (FIG. 6c). If the last bit of the previous symbol was zero, the first bit of the control* symbol is one (FIG. 6d).

For these cases, a transition occurs between the symbols of the token.

These rules enable the boundaries between data tokens and control tokens to be identified to ensure that proper synchronisation is achieved in transmission and reception as will further be described hereinafter. The application of this rule to the symbols shown in FIG. 5 is given in Table 3 overleaf.

TABLE 3

| Control Tokens | Previous Symbol | 1st symbol | | 2nd symbol | 3rd symbol | 4th symbol |
|---|---|---|---|---|---|---|
| EOP | xxxxx0 | 010101 | checksum | (data) | | |
| EOP | xxxxx1 | 101010 | checksum | (data) | | |
| EOM | xxxxxx | checksum (data) = | xxxxx0 | 010101 | | |
| EOM | xxxxxx | checksum (data) = | xxxxx1 | 101010 | | |
| FCT | xxxxx0 | 010101 | | 101010 | | |
| FCT | xxxxx1 | 101010 | | 010101 | | |
| IDLE | xxxxx0 | 010101 | | 010101 | | |
| IDLE | xxxxx1 | 101010 | | 101010 | | |
| Initialize | xxxxx0 | 010101 | | 010101 | 010101 | 010101 |
| Initialize | xxxxx1 | 101010 | | 101010 | 101010 | 101010 |
| Reserved | xxxxx0 | 010101 | | 010101 | 010101 | data |
| Reserved | xxxxx1 | 101010 | | 101010 | 101010 | data |

In Table 3 reference is made to "checksum (data)". For the time being, it is convenient to consider this merely as any of the data symbols in Table 1.

A control symbol can be readily identified by a lack of transition between the end of the preceding symbol and the beginning of the next, followed by a sequence of transitions exceeding the number of transitions permitted in a data symbol. The presence or absence of transitions can also be used to distinguish between the FCT and IDLE tokens (the FCT symbol having no transition between its first and second symbols and the IDLE token having a transition between its first and second symbols). The Initialize token and Reserved tokens are extended sequences of alternating bits, generated so that there is a lack of transition between individual tokens. This absence of transition forms part of the initializing sequence as will be described in more detail hereinafter. The initialise token has 24 alternating bits. A sequence of more than twenty-eight alternating bits is illegal. Twenty-eight alternating bits could occur if an initialise token was followed by a symbol representing the Hex values 1 or E.

Checking Data

Figure 7:
FIG. 7 is a representation of a packet in data-strobe format.

Referring back to FIGS. 5b and 5c, each of the end of packet (EOP) and end of message (EOM) tokens include a data symbol which is marked checksum. The checksum is a 3-of-6 data symbol corresponding to four longitudinal parity bits derived from a packet in data-strobe format. FIG. 7 illustrates the construction of a packet in data-strobe format. Thus, the packet comprises a header portion including channel information for identifying a channel destination of the packet, a plurality of data tokens of the type described above with reference to FIG. 2 and an end of packet token. As described above with reference to FIG. 2, each data token comprises two four bit Hex values, having bits p, q, r and s.

Each longitudinal parity bit Σp, Σq, Σr and Σs is the logical sum of each of the respective bits p, q, r and s of each of the Hex values in the packet, including the Hex values which define the header. An example of generation of the longitudinal parity bits is given below. The data of the packet below is the sequence of bytes (in conventional Hex with the most significant nibble written on the left) Hex ED0C6F03.

| Hex value | Binary | | | |
|---|---|---|---|---|
| | lsb | | | msb |
| | p | q | r | s |
| 3 | 1 | 1 | 0 | 0 |
| 0 | 0 | 0 | 0 | 0 |
| F | 1 | 1 | 1 | 1 |
| 6 | 0 | 1 | 1 | 0 |
| C | 0 | 0 | 1 | 1 |
| 0 | 0 | 0 | 0 | 0 |
| D | 1 | 0 | 1 | 1 |
| E | 0 | 1 | 1 | 1 |
| | 1 | 0 | 1 | 0 |

The four longitudinal parity bits 1010 are encoded into a 3-of-6 symbol according to Table 1 (101100), and this symbol is known as the checksum symbol. In the present encoding format, the checksum is transmitted as part of the end of packet or end of message tokens as described above. This reduces the need for extra transmission bits which are normally required for checking and takes advantage of an important feature of the present invention that all tokens are the same length. The checksum can be used for checking the parity of the packet on receipt. The logical sum of all of the p bits of the data tokens plus the Σp bit of the checksum should be zero, and similarly the bits q, r and s when a check of the longitudinal parity is carried out using the checksum. For the example illustrated above, the check is carried out as indicated below.

| Hex value | Binary | | | |
|---|---|---|---|---|
| | lsb | | | msb |
| | p | q | r | s |
| 3 | 1 | 1 | 0 | 0 |
| 0 | 0 | 0 | 0 | 0 |
| F | 1 | 1 | 1 | 1 |
| 6 | 0 | 1 | 1 | 0 |
| C | 0 | 0 | 1 | 1 |
| 0 | 0 | 0 | 0 | 0 |
| D | 1 | 0 | 1 | 1 |
| E | 0 | 1 | 1 | 1 |
| | 1 | 0 | 1 | 0 |
| | 0 | 0 | 0 | 0 |

Any single bit error will be detected by producing an illegal 3-of-6 code symbol, because a single bit error would cause there to be other than three zeros and three ones in one symbol. Thus, the main purpose of the longitudinal parity check outlined above is to detect double bit errors which might not be detected by the code itself.

Figure 8A:
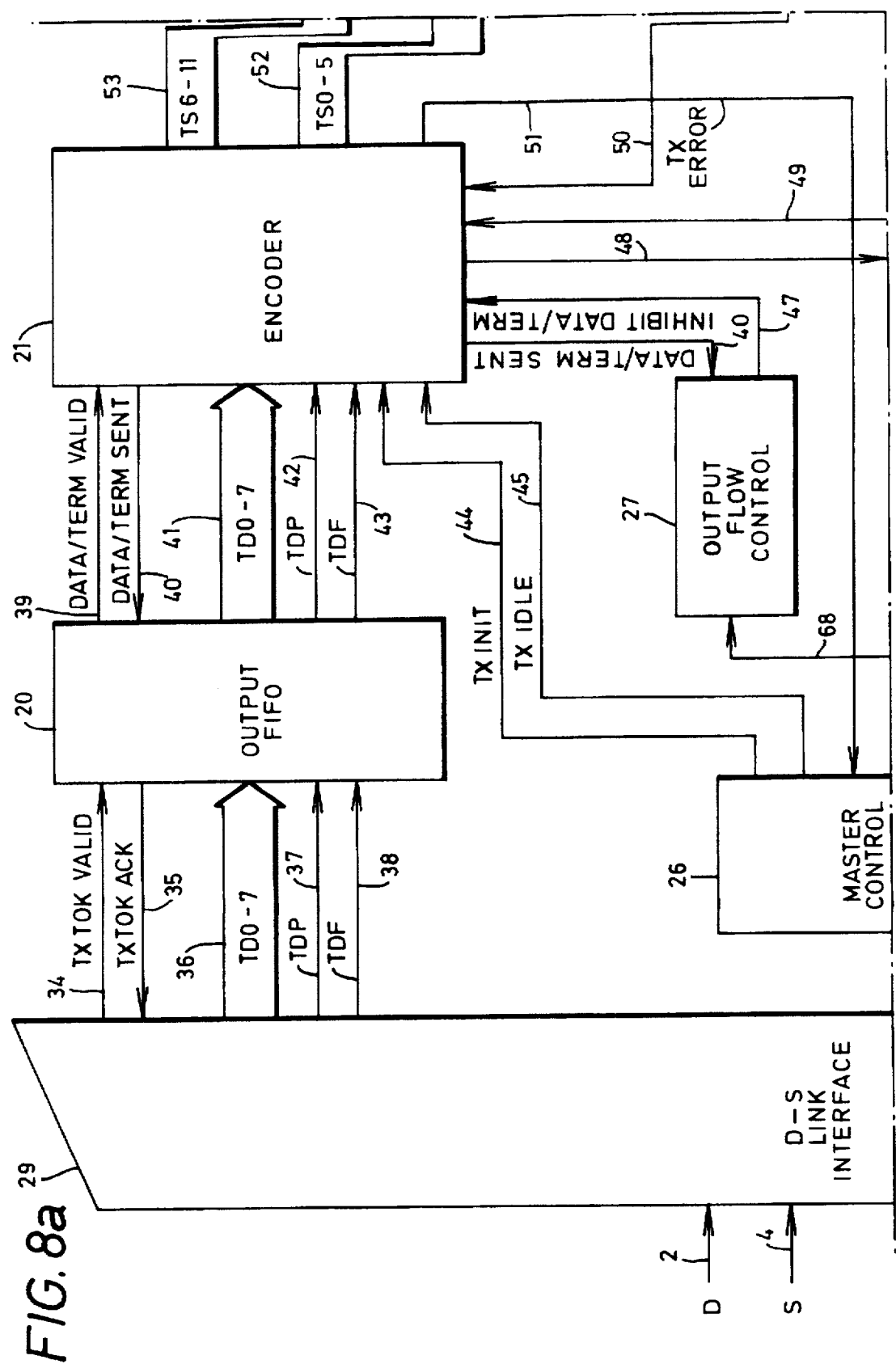
Figure 8B:
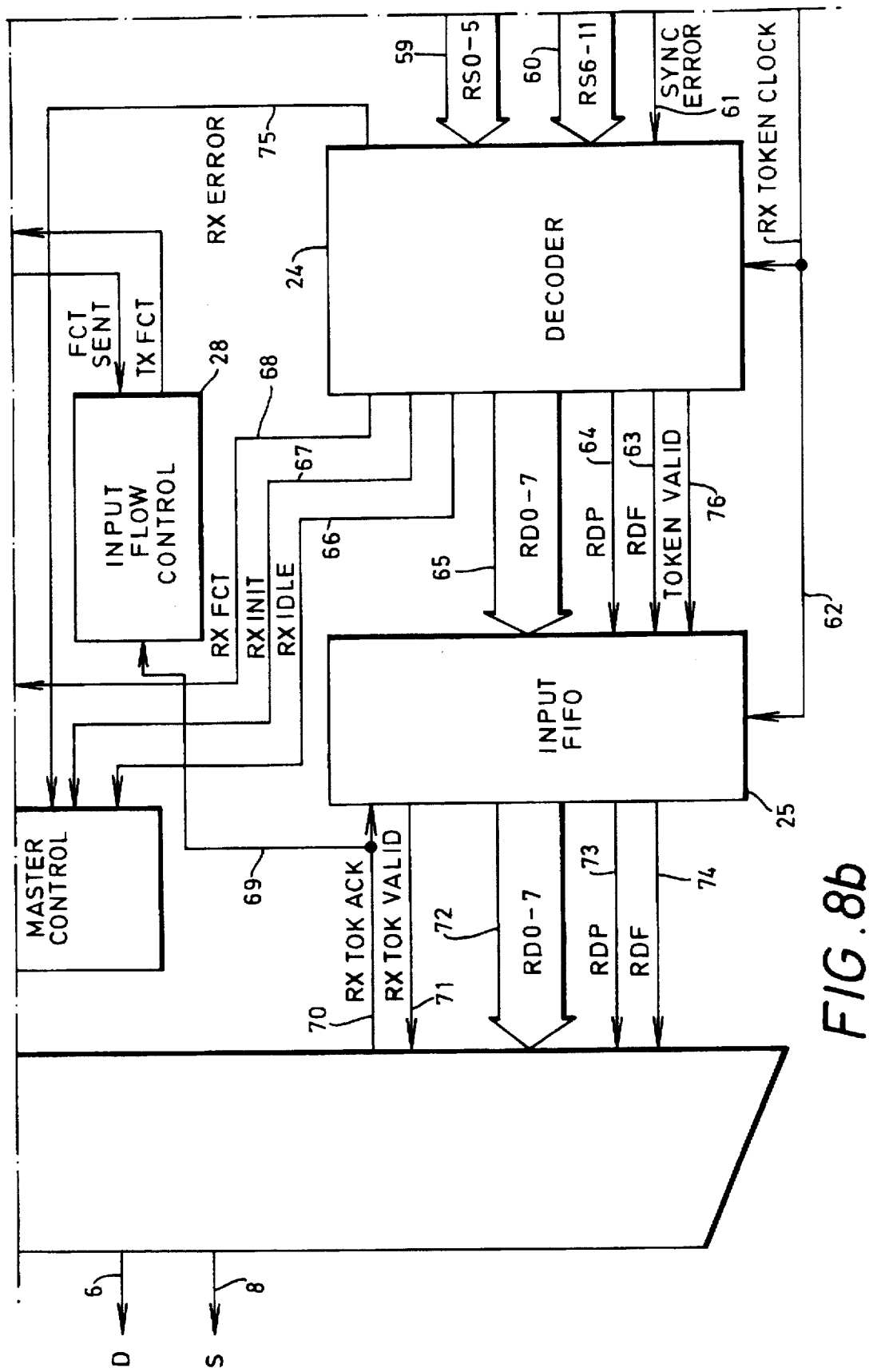
Figure 8C:
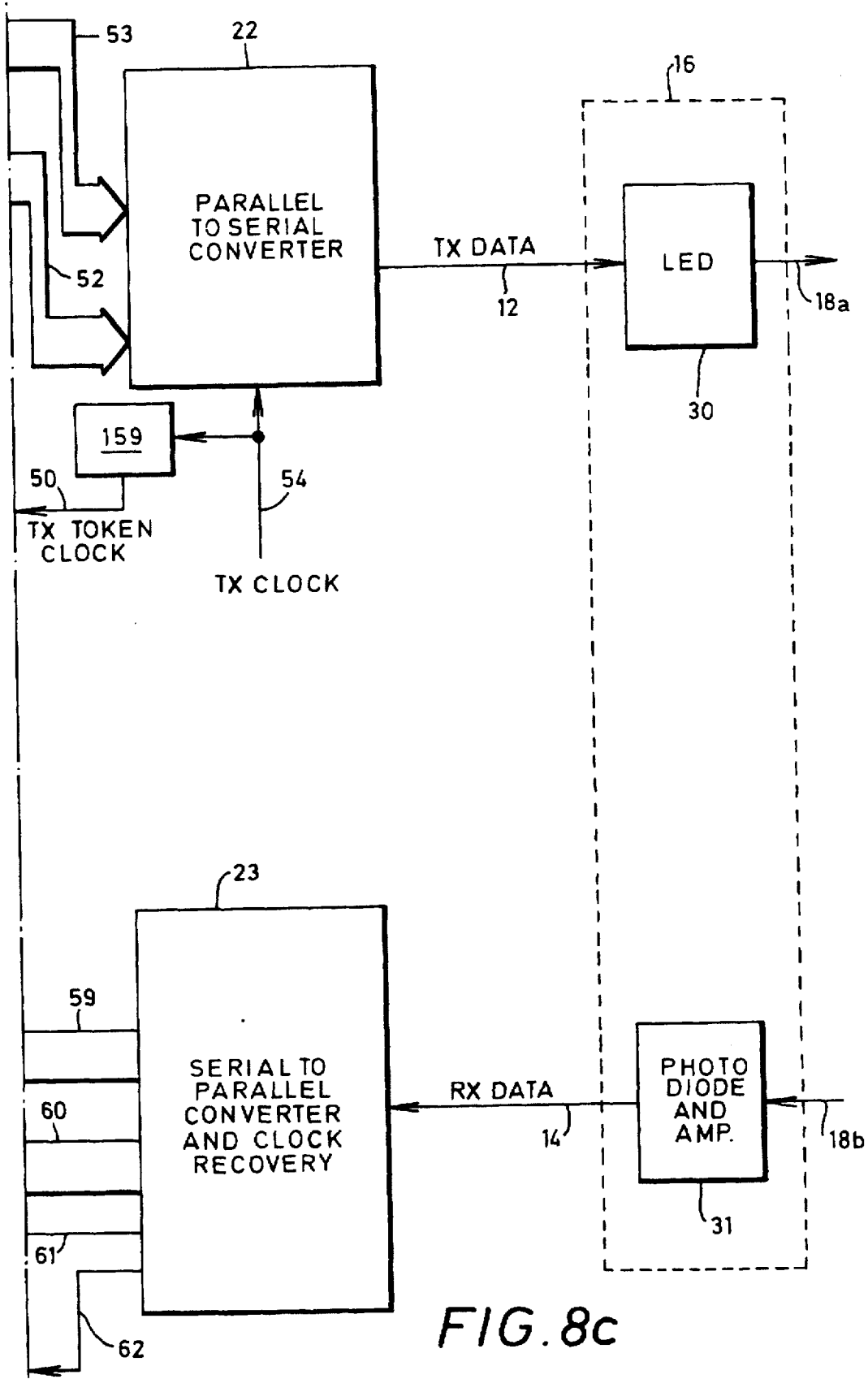

FIG. 8 is a block diagram of a circuit implementing an encoder/decoder 10 as shown in FIG. 1. Serial data and strobe signals D and S on lines 2 and 4 respectively are received as inputs by a data-strobe link interface 29. The interface 29 then outputs a set of bits in parallel format representing the data in the D-S token, as illustrated for example in FIG. 2, and a TX TOK VALID signal indicating the presence of a valid transmit parallel token. The term transmit parallel token is used herein to denote the token derived from the incoming D-S token for encoding. Thus eight data bits TD0–7 on bus 36, 6 flag bit TDF (or TCF) on line 38 and a parity bit TDP on line 37 are output in parallel. The flag bit indicates whether the eight data bits TD0–7 are part of a terminator token or a data token. If the flag bit TDF indicates the token is a data token all eight bits are used. If the flag bit TCF indicates the token is a terminator token only the two least significant bits, TC0, TC1, are used. The parity bit on line 37 is not the same as the parity bit in D-S format but is derived from it in a manner which can readily be determined by a skilled person. The signals TD0–7, TDP and TDF are supplied to an output FIFO 20, along with the TX TOK VALID signal on line 34. When the output FIFO 20 receives a TX TOK VALID signal, and has space, the bits TD0–7, TDP and TDF are read into the output FIFO, and the output FIFO generates a signal TX TOK ACK on line 35. The signal TX TOK ACK is used by the interface 29 to indicate that the output FIFO 20 has read the current output bits of the interface 29 on lines 36, 37, 38 and that the interface 29 can output its next transmit parallel token. When the output FIFO 20 has input a valid transmit parallel token from the interface 29, it generates an output signal DATA/TERM VALID on line 39, and presents the bits TD0–7, TDP and TDF on output lines 41, 42, 43.

An encoder 21 receives the bits TD0–7, TDP and TDF from lines 41,42,43. The encoder 21 also receives TX INIT and TX IDLE signals on lines 44 and 45 from a master control circuit 26, the operation of which will be described in detail herein below. The encoder 21 also receives a signal INHIBIT DATA/TERM on line 47 from an output flow control circuit 27 and a signal TX FCT on line 49 from an input flow control circuit 28. The operation of the input and output flow control circuits 27 and 28 will be further described in detail hereinbelow. The encoder 21 also receives a transmit token clock signal TX TOKEN CLOCK on line 50 from a clock divider 159. This transmit token clock signal is generated as will be further described with reference to FIG. 12, so as to generate a clock edge for every token, i.e., every twelve symbol bits.

The encoder 21 generates a 3-of-6 token consisting of a pair of symbols TS0–5 on the bus 53 and TS6–11 on the bus 52. The encoder 21 also generates an error signal TX ERROR on line 51 to the master control circuit 26 and a signal to indicate that a data or terminator token has been sent, DATA TERM SENT, on line 40 to the output flow control unit 27. The encoder 21 further generates a signal on line 48 FCT SENT to indicate to the input flow control circuit that a flow control token has been sent. The symbol bits TS0–11 on buses 52 and 53 are then presented to a parallel to serial converter 22 where they are converted into serial format suitable for transmission under the control of the fast clock signal TX CLOCK on line 54, and output on line 12 to an LED 30, which forms part of the optoelectrical transceiver 16, where it is converted to a form suitable for transmission on the optical fibre link 18.

Incoming serial data in the form of 3-of-6 symbols on the optical fibre link 18b is fed into a photo-diode and amplifier stage 31, which forms part of the optoelectrical transceiver circuit 16, where it is converted into an electrical serial signal RX DATA on line 14 at a signal level suitable for processing. The serial data on line 14 is fed as an input to a serial to parallel converter and clock recovery unit 23, which will be described in detail with reference to FIG. 13.

The serial to parallel converter and clock recovery unit 23 generates in parallel the 12 bits of a 3-of-6 token RS0–11 on buses 59 and 60, as well as a token synchronisation error signal SYNC ERROR on line 61 and a receive token clock signal RX TOKEN CLOCK on line 62. The receive token clock signal RX TOKEN CLOCK is used by the decoder 24 and the input FIFO 25 in a manner which will be further described hereinbelow. The decoder 24 also receives the token synchronisation error signal SYNC ERROR on line 61 and the parallel 3-of-6 token RS0–11 on buses 59 and 60.

The decoder 24 decodes the 3-of-6 token represented by the bits RS0–11 into a received parallel token represented by the bits RD0–7 on the output bus 65, the parity bit RDP on line 64 and the flag bit RDF on line 63.

When the received parallel token is presented at its outputs the decoder 24 also presents a token valid signal TOKEN VALID on line 76, indicating to the input FIFO 25 that the received parallel token data bits RD0–7, flag bit RDF and parity bit RDP are ready to be written to the input FIFO 25. On receipt of a flow control token the decoder 24 also generates a signal RX FCT on line 68 to the output flow control circuit 27. Similarly, if the decoder 24 receives an idle token it generates a signal RX IDLE to the master control circuit 26 on line 66, and if it receives an initialise token it generates a signal RX INIT to the master control circuit 26 on line 67. The decoder also generates a signal RX ERROR on line 75 to the master control unit to indicate receipt of an error.

If the input FIFO 25 has a valid received parallel token stored in it, it will present the data bits RD0–7 on the bus 72, the flag RDF on line 74 and the parity bit RDP on line 73 to the data-strobe interface 29 along with a received parallel token valid signal 71 RX TOK VALID. If the data-strobe interface reads the received parallel token presented by the input FIFO 25, it will acknowledge so by sending an acknowledge signal RX TOK ACK to the input FIFO 25 on line 70 and also to the input flow control circuit 28 on line 69.

Figure 9:
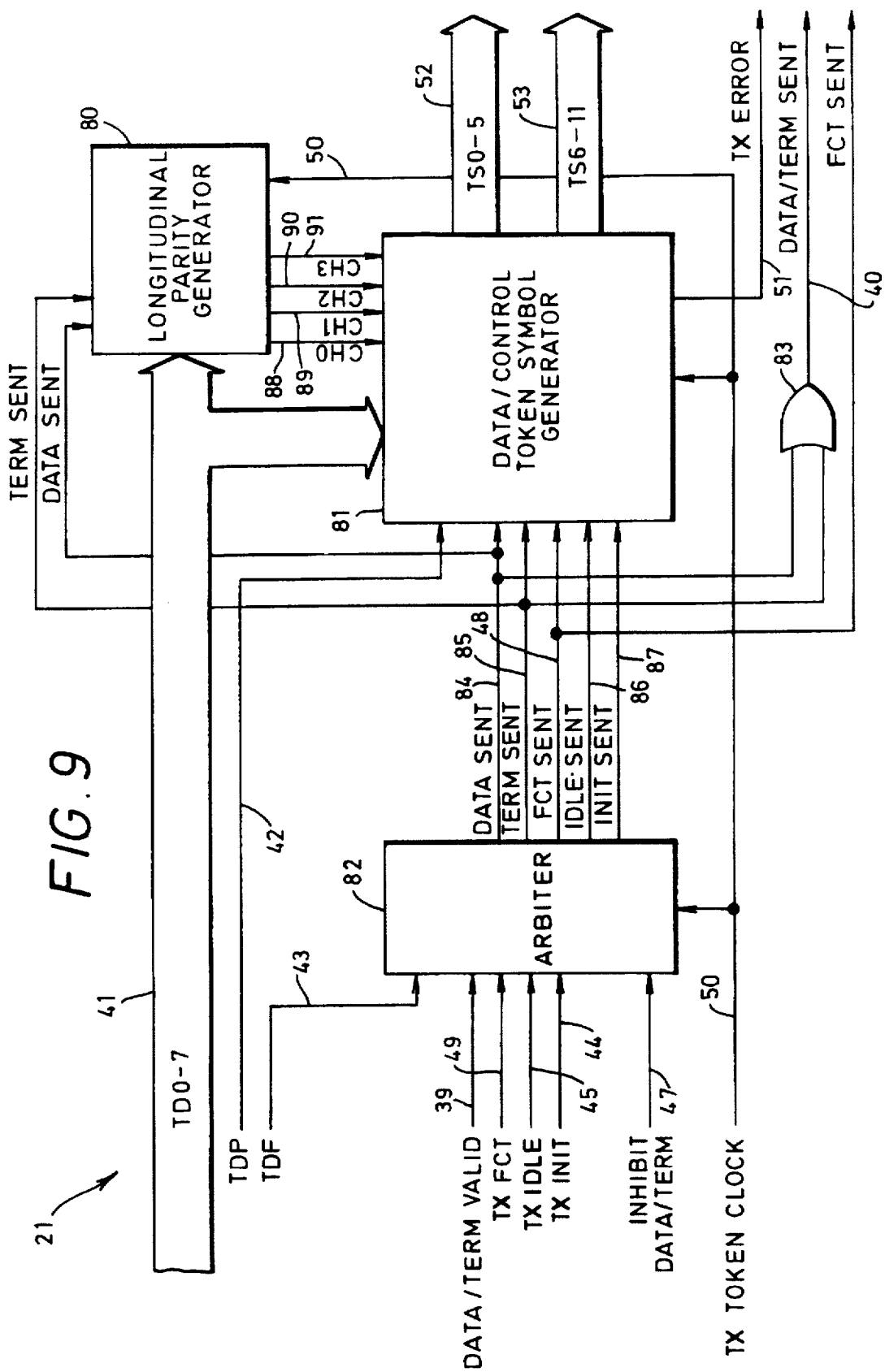
FIG. 9 is a circuit diagram of a transmit encoder.

The operation of the encoder 21 will now be described in detail with reference to FIG. 9. As shown in FIG. 9, the encoder 21 consists of an arbiter 82, a longitudinal parity generator 80, and a data/control token symbol generator 81. The arbiter 82 contains circuitry to prioritise request signals presented at its inputs. These request signals are; DATA/TERM VALID (request to send a data or terminator token), TX FCT (request to send a flow control token), TX IDLE (request to send an idle token), and TX INIT (request to send an initialise token). The arbiter 82 prioririses the requests in the order TX INIT, TX FCT, DATA/TERM VALID, TX IDLE. This allows the encoder 21 to continue to operate without clashes when more than one request is made at the same time. The arbiter 82 also takes as inputs the flag bit TDF on line 43 from the output FIFO 20, the signal INHIBIT DATA/TERM on line 47 from the output flow control circuit 27, and the transmit token clock signal TX TOKEN CLOCK on line 50. The arbiter 82 provides five outputs depending on which requests have been received. The output DATA SENT on line 84 is set if the DATA/TERM VALID signal is set and the flag bit TDF indicates a data token is to be sent. The output TERM SENT on line 85 is set if the DATA/TERM VALID signal is set and the flag bit TDF indicates a terminator token is to be sent. The signals FCT SENT, IDLE SENT, INIT SENT on lines 48, 86 and 87 respectively are set if the signals TX FCT, TX IDLE, TX INIT respectively are to be sent. The five outputs from the arbiter 82 are presented as inputs to the data control token symbol generator 81. The INHIBIT DATA/TERM input 47 to the arbiter 82 is used to inhibit the setting of the DATA SENT and TERM SENT signals, and its generation and use will be described in detail later.

The longitudinal parity generator 80 receives as inputs the data bits TD0–7 from the output FIFO 20 on line 41, the signal TERM SENT on line 85 from the arbiter 82 and the transmit token clock signal TX TOKEN CLOCK on line 50. The longitudinal parity generator 80 will be described with reference to FIG. 11. The longitudinal parity generator generates the four longitudinal parity bits CH0–3 on lines 88–91 as described earlier, and these parity bits are input to the data/control token symbol generator 81. As well as the five outputs from the arbiter 82 and the checksum bits CH0–3, the data/control token symbol generator 81 also receives the data token bits TD0–7 for the bus 41 and the transmit token clock TX TOKEN CLOCK. The data/control symbol generator then outputs a parallel token in the form of two symbols, with bits TS0–5 constituting one symbol on a bus 52 and bits TS6–11 constituting a second symbol on bus 53. The data/control symbol generator also outputs an error signal TX ERROR on line 51 to the master control circuit 26. The signals TERM SENT and DATA SENT respectively indicating that a terminator token or a data token is being sent are also outputted from the arbiter 82 on lines 85 and 84 to a logical OR gate 83, the output of which DATA/TERM SENT on line 40 indicates to the output flow control circuit that a data or terminator token is being sent. The signal FCT sent to indicate that a flow control token is being sent is also outputted from the arbiter 82 to the input flow control circuit 28 on line 48.

Figure 11:
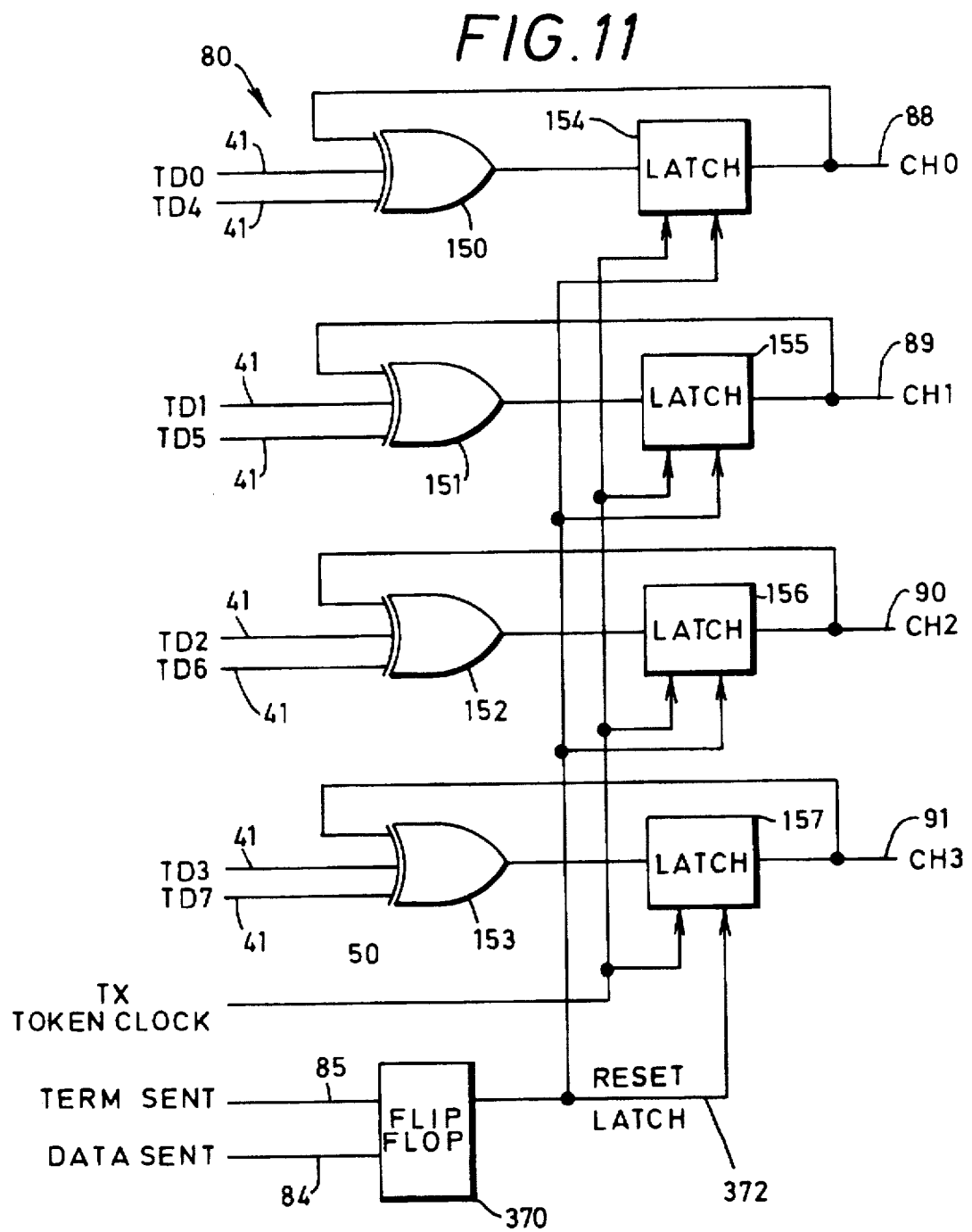
FIG. 11 is a circuit diagram of a longitudinal parity generator.

FIG. 11 shows that the longitudinal parity generator 80 comprises a flip-flop 370, four exclusive-OR gates 150–153, and four latches 154–157 connected respectively to the outputs of the exclusive OR gates. Gate 150 receives data bits TD0 and TD4, gate 151 receives data bits TD1 and TD5, gate 152 receives data bits TD2 and TD6, and gate 153 receives data bits TD3 and TD7. Each of the gates 150–153 also receives a third input which is the output of its associated latch 154–157 respectively fed back. Hence the third input to each of the gates is its respective output clocked through a latch. As has been explained above, the transmit token clock signal TX TOKEN CLOCK on line 50 has a clock edge for every time a new data token is read out of the output FIFO 20 by the signal DATA/TERM SENT on line 40. Hence the outputs of the latches 154–157 on lines 88–91 are an accumulation of the respective bits of successive tokens in a packet output from the output FIFO 20, as described earlier. The checksum is thus the set of bits CH0–3 representing the accumulated sum on each line 88–91. The checksum bits on lines 88–91 are output to the data/control token symbol generator 81. The flip-flop 370 is used to control the operation of the latches 154–157.

During such operation of the longitudinal parity generator 80 as data is being transmitted and the signal DATA SENT on line 84 is high and the signal TERM SENT on line 85 is low, the output RESET LATCH of the flip-flop 370 on line 372 will be low thereby allowing the latches to accumulate a checksum value as described above. When the signal TERM SENT on line 85 goes high indicating a terminator is now being sent the RESET LATCH output of the flip-flop 370 on line 372 will toggle and go high causing the latches 154–157 to be reset. The flip-flop 370 will introduce a delay between TERM SENT on line 85 going high and RESET LATCH on line 372 following it. This delay allows the checksum value CH0–3 on lines 88–91 to be latched into the data/control token symbol generator 81 before being reset as will be described further hereinbelow. Subsequently, when the signal DATA SENT on line 84 goes high indicating data tokens are now being sent the signal RESET LATCH on line 372 on the output of the flip-flop will toggle and go low allowing the latches 154–157 to start accumulating a new checksum. In this way the latches are always reset at the end of a packet and held so until transmission of a new packet has started.

Figure 10A:
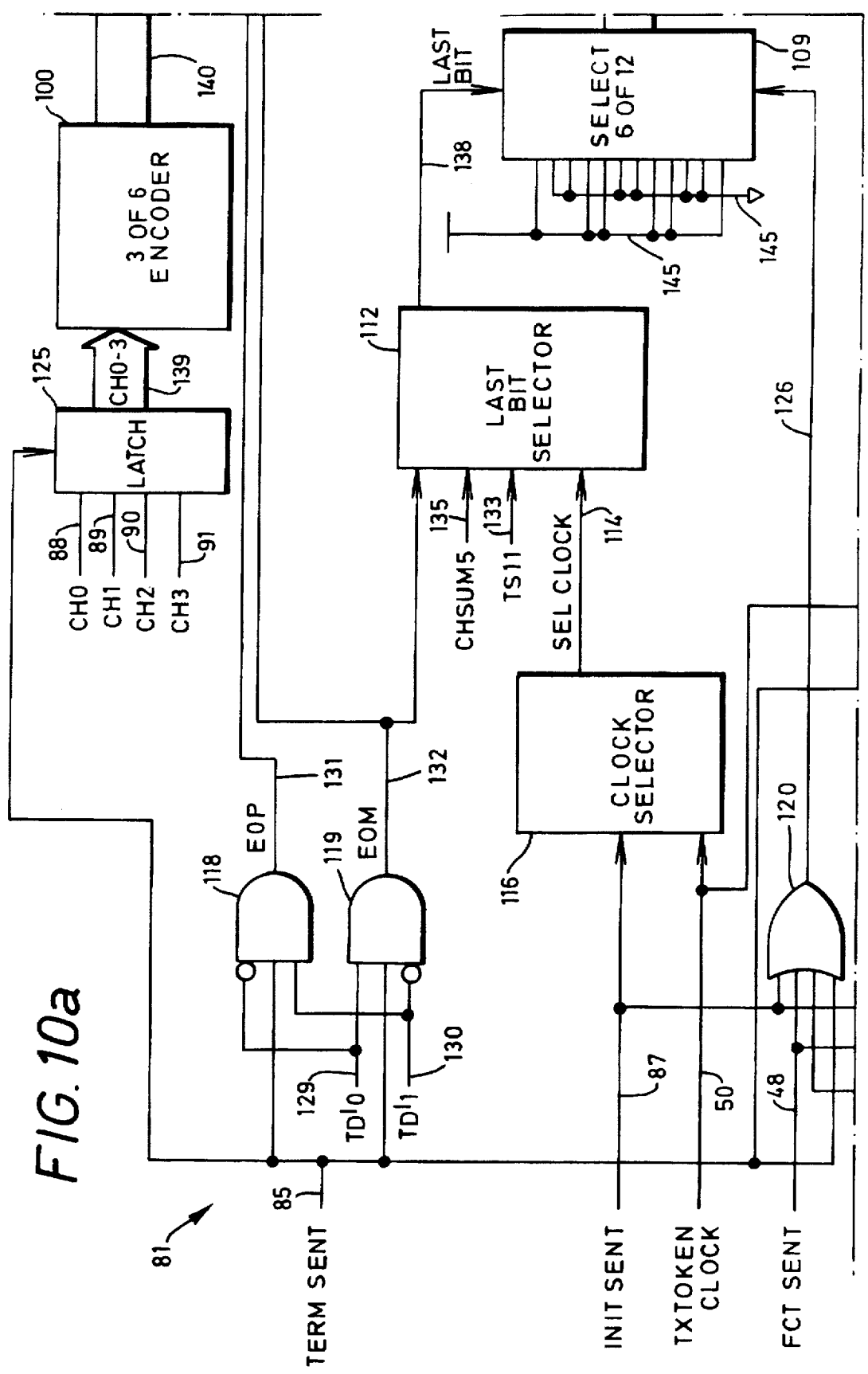
Figure 10B:
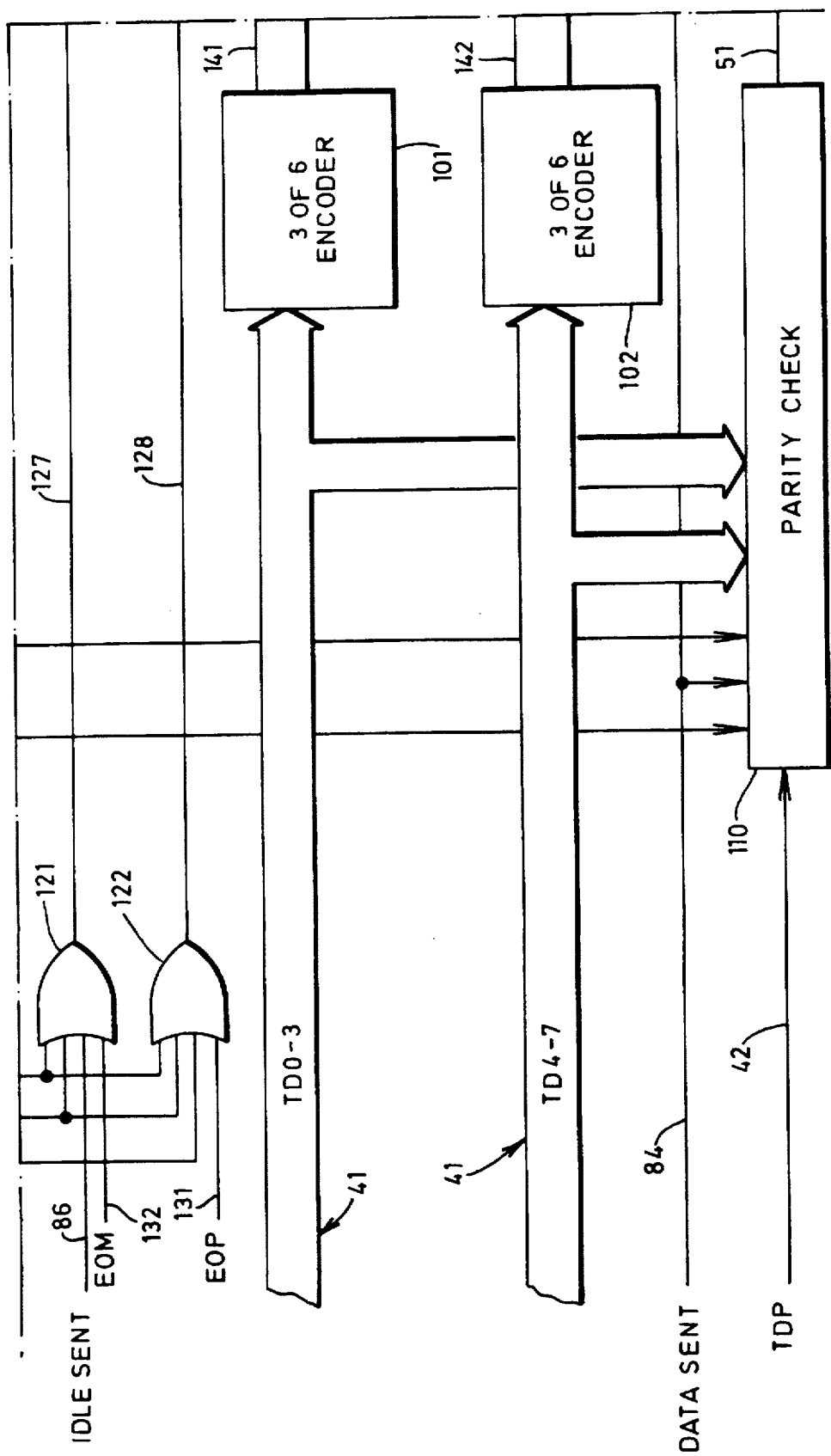

One embodiment of a data/control token symbol generator 81 will now be described in detail with reference to FIG. 10. As illustrated in FIG. 10, the data/control token symbol generator 81 consists of six buffers 103–108, three 3-of-6 encoders 100–102, a selector 109, a latch 125, a clock selector 116, a last bit selector 112, a parity check circuit 110 and logic circuits described more fully herein. The buffers 103–108 are all tristate devices, so that their outputs may be any one of three states namely low, high or high impedance. The high impedance state is achieved by disabling the buffer. In this way it is possible for all of the buffers 103, 106, 107 to provide outputs commonly onto the bus 52 and for all the buffers 104, 105, 108 to provide outputs commonly onto the bus 53. Only one of the buffers 103, 106, 107 is enabled at any one time, and only one of the buffers 104,105,108 is enabled at any one time. The data/control token symbol generator has a gate 120 to enable a selector 109, a gate 121 to enable the buffer 105, a gate 122 to enable the buffer 106, and gates 118 and 119 to decode terminator tokens. The data/control token symbol generator 81 receives data bits TD0–7 from the output FIFO 20 on bus 41, check sum bits CH0–3 from the longitudinal parity generator 80 on lines 88–91, and inputs DATA SENT, TERM SENT, FCT SENT, IDLE SENT, INIT SENT on the lines 84, 85, 48, 86, 87 respectively from the arbiter 82. The data/control token symbol generator 81 also receives the transmit token clock signal TX TOKEN CLOCK from the divider 159. The operation of the data/control token symbol generator 81 will now be described with reference to examples of transmitting various types of token.

Consider first the example where a data token is being transmitted. In this example the signal DATA SENT on line 84 will be active with all other signals from the arbiter 82 being inactive. All eight data bits TD0–7 on lines 41 will be valid. The least significant bits TD0–3 are input to the 3-of-6 encoder 101 which converts them to a six bit symbol according to Table 1. The six bit symbol S0–5 is output on bus 141. Similarly the four most significant bits TD4–7 will be sent as inputs to the 3-of-6 encoder 102 which converts them to a six bit symbol according to Table 1. The six bit symbol S6–11 is output on bus 142. While the data bits TD0–3 and TD4–7 are input to the respective 3-of-6 encoders 101 and 102 the accumulated checksum bits CH0–3 on lines 88–91 are input to a latch 125 which is clocked by the signal TERM SENT on line 85. Hence as long as data tokens are being sent the checksum bits CHSUM0–5 on lines 139 will not be clocked into the latch 125. Whilst data tokens are being sent the signal DATA SENT will enable the buffers 107 and 108 whilst buffers 103–106 will be disabled. Hence the outputs TS0–5 on lines 52 will be a symbol forming the least significant bits of a 3-of-6 data token and the outputs TS6–11 on lines 53 will be a symbol forming the most significant bits of a 3-of-6 data token. These two symbols are clocked into the parallel to serial converter 22 by the clock signal TX TOKEN CLOCK in a manner which will be described later.

Now consider the example when an end of packet (EOP) terminator token is to be sent (for example as in FIG. 5). In this case the input TERM SENT on line 85 will be active. Line 85 becoming active causes the checksum latch 125 to latch in the value of the accumulated checksum CH0–3 on lines 88–91. The checksum value CH0–3 then appears on lines 139 on the output of the latch 125 which form the input to the 3-of-6 encoder 100. The 3-of-6 encoder then converts the bits CH0–3 into a 3-of-6 checksum symbol CHSLTM0–5 on lines 140. The signal TERM SENT is supplied to two terminator decode AND gates. When a control token is being sent only the two least significant bits of the data bits TD0–7 are used, TC0 and TC1 in FIG. 3. Gates 118 and 119 each have two further inputs. Gate 118 takes bit TC1 from the input lines 41 and the inverse of bit TC0 from the input lines 41. Gate 119 takes bit TC0 from the input lines 41 and the inverse of bit TC1 from the input lines 41.

Hence the gates 118 and 119 are used to decode the two least significant bits to determine whether the terminator token being sent is an end of packet (EOP) token or an end of message (EOM) token. If an EOP is being sent, line 131 on the output of gate 118 will become active, and if an EOM is being sent line 132 on the output of gate 119 will become active.

Hence for an EOP token, TERM SENT on line 8.5 going active causes EOP on line 131 to go active and enable the buffer 104. TERM SENT is also input to an OR gate 120 and causes the output 26 of gate 120 to go high. The output of the OR gate 120 is connected to a selector 109 which is then enabled when TERM SENT is active. The output 131 of gate 118 is also connected as an input to an OR gate 122 whose output 128 goes active when EOP is active to cause buffer 106 to be enabled.

Buffers 103,105,107,108 are disabled.

The last bit selector 112 is used to determine logic value (0 or 1) of the last serially transmitted bit. When any control token other than an EOM token is being sent, the last bit serially transmitted before the control symbol will be the most significant bit of the last data token, i.e., bit TS11 on line 133. However, in the case of an EOM token, the last bit serially transmitted will be the most significant bit of the checksum, i.e., bit CHSUM5 on line 135. Hence the last bit selector 112 takes as inputs the most significant bit of the checksum CHSUM5, the most significant bit of the data token TS11, the EOM signal on line 132, and the selector clock signal SEL CLOCK on line 114 from the clock selector 116. The last bit selector 112 has a one-bit memory cell which will store on the select clock input SEL CLOCK the last bit transmitted before a control symbol according to whether the control token to be sent is EOM or not.

The clock selector 116 takes as inputs the signal INIT SENT on line 87 which indicates if an initialise token is being sent and the transmit token clock TX TOKEN CLOCK on line 50. For every type of token sent except an initialise token, the clock selector 116 will output the transmit token clock TX TOKEN CLOCK as the select clock SEL CLOCK on line 114 and the last bit to be transmitted will thus be clocked into the memory in the last bit selector 112 with every token transmitted, i.e., every twelve bits transmitted. It has been explained, however, that an initialise token is twenty four bits long, and therefore when an initialise token is being sent the clock selector 116 outputs a select clock signal SEL CLOCK on line 114 which is half the frequency of the transmit token clock TX TOKEN CLOCK, i.e., it has a rising edge every twenty four bits.

When the selector 109 is enabled on line 126, the value of line 138 determines which of two control symbols appear on the output in accordance with FIGS. 6(a) and 6(b). If the value of the line 138 is zero, the value of bits CONT0–5 on lines 144 will be 010101, whilst if the value of line 138 is one, the value of bits CONT0–5 on lines 144 will be 101010. One way of achieving this is to tie the inputs 145 of the selector 109 to either Vcc at ground so that the selector can generate either one of the two control symbols 010101 or 101010. Hence, the input signal on line 138 allows the control symbol to be chosen so that it satisfies the criteria illustrated in FIGS. 6(s) and 6(b) as to whether or not there is a transition before the first bit.

The first symbol of any sequence of control or control* symbols will always be a control symbol and never a control* symbol, as is illustrated by FIG. 5. It is therefore only necessary for the selector 109 to generate control symbols, as a control* symbol is simply a repeat of the preceding control or control* symbol. Similarly, a second control symbol following a first control symbol will effectively be the same bit pattern but with all the bits inverted. Hence all combinations of control and control* symbols can be generated by selecting a control symbol with the selector 109, and then either allowing its true or complement value to pass through one of the buffers 105,106 on to the output buses 52 or 53 representing token symbol bits TS0–5 and TS6–11 respectively.

As shown by FIG. 5(b) EOP is a control symbol followed by a data (checksum) symbol, hence a control symbol, the pattern of which is determined by bit TS11 of the previous symbol pair, will be outputted through buffer 106 and bus 52 as bits TS0–5 in the first symbol, and the checksum will be outputted through buffer 104 onto bus 53 as bits TS6–11 of the second symbol.

Now consider the example when an end of message (EOM) terminator token is to be sent. The signal TERM SENT on line 85, indicating that a terminator is being sent, will go active enabling the gates 118 and 119, which will decode the bits TD0 and TD1 on lines 129 and 130 such that EOM on line 132 on the output of AND gate 119 will go active. EOM on line 132 will cause the output of gate 121 to go active enabling buffer 105, and EOM will also cause buffer 103 to be enabled. Buffers 104, 106, 107, 108 will all be disabled. The SEND TERM terminator signal also causes the output of gate 120 to go active causing selector 109 to be enabled. As before, SEND TERM also causes the value of the checksum on lines 88–91 to be latched into the latch 125. As is illustrated in FIG. 5(c), an EOM token is represented by a data (checksum) symbol followed by a control symbol. Hence, with EOM tokens the selector 109 needs to know the most significant bit CHSUM5 on line 135 of the checksum, since this is the bit that will preceed the control symbol in serial transmission. Hence when EOM goes high bit CHSUM5 is clocked into the bit memory of last bit selector 112 by the signal EOM at the same time as the bits CH0–3 are clocked into the latch 125 by TERM SENT. Also, when EOM is active the selector is selected according to the last bit of the checksum. Hence during an EOM transmission the checksum CHSUM0–5 on bus 140 will be buffered through the buffer 103 onto the bus 52 to be bits TS0–5 of the first symbol of a 3-of-6 token and the control symbol will be buffered through buffer 105 onto the bus 53 to be bits TS6–11 of the second symbol of a 3-of-6 token.

When a flow control token has been requested, FCT SENT will be active on line 48. This will cause the outputs of gates 120,121,122 to all go active enabling the selector 109, the buffer 105 and the buffer 106 respectively. The buffers 103,104,107,108 will be disabled. As can be seen from FIG. 5(d) a flow control token is a control symbol followed by a control symbol. Hence if the first symbol is 010101 the second symbol will be 101010 and vice versa. In the usual manner the transmit token clock TX TOKEN CLOCK clocks the most significant bit TS11 of the last symbol sent into the bit memory in the last bit selector 112. This bit is supplied on line 138 to the selector 109. Hence the selector selects the control symbol to be output through buffer 106 as bits TS0–6 on the bus 52. This pattern is also provided to buffer 105, but the complement/true input of buffer 105 is connected to the inverse of FCT SENT so that the buffer passes through to its output the complement value of its inputs. Hence, each of the bits outputted by the selector 109 will be inverted and outputted through the buffer to be transmitted as bits TS6–11 on the bus 53. Hence the symbol pair on lines 52 and 53 conform to the criteria of a flow control token as defined in FIG. 5(d).

When an idle token has been requested, IDLE SENT on line 86 will go active. This will cause the outputs of gates 120,121 and 122 to go active, enabling the selector 109, the buffer 105 and the buffer 106 respectively. The buffers 103, 104, 107, 108 will be disabled. As can be seen from FIG. 5(e), an idle token is a control symbol followed by a control* symbol. Hence, the second symbol will be a copy of the first symbol. As described in detail previously, the transmit token clock signal TX TOKEN CLOCK clocks the most significant bit TS11 of the last symbol sent into the bit memory of the last bit selector 112, and this bit is supplied on line 138 to the selector 109. Hence the selector selects the control symbol to be output through buffer 106 as bits TS0–6 on the bus 52. In the case of an idle token, this pattern is also provided to the inputs of the buffer 105, and since a flow control token is not being sent, the outputs of the buffer 105 will follow the true input value. Hence, the symbol values on bits TS6–11 on the bus 53 through buffer 105 will be the same as those on the bus 52. Hence the symbol pair on the buses 52 and 53 conform to the criteria of an idle token as defined in FIG. 5(e). The last type of token that can be transmitted in this embodiment is an initialise token. When an initialise token is to be sent, the signal INIT SENT on line 87 will become active. As with the other types of control tokens, this will cause the outputs of gates 120, 121, 122 to become active and thereby cause the selector 109, the buffer 105 and the buffer 106 to become enabled respectively. Further, line 87 becoming high causes the clock selector 116 to output a select clock signal SEL CLOCK which is half the transmit token clock TX TOKEN CLOCK frequency. Hence the memory bit in the last bit selector 112 will be clocked once for every four symbols transmitted rather than for every two symbols transmitted. The reasons for this can be best explained by considering the format of an initialise token as shown in FIG. 5(f). It can be seen that such a token consists of four symbols; a control symbol followed by three control* symbols. As explained earlier, for an initialise sequence the token length is four symbols rather than two, hence the transmit token clock is required to be half the speed. Hence it is required to clock in to the bit memory in the last bit selector 112 the value of the last serially transmitted bit at the start of an initialise sequence, so as to determine the bit pattern of the control symbol which is the first of the four symbols. Thereafter, the three control* symbols imply that the bit pattern of the three next symbols must be identical to that of the first. It is therefore required to inhibit the clock clocking the flip-flop 124 on line 133 so as the last serially transmitted bit is not clocked after twelve bits of an initialise token, thereby generating a sequence which would look like an idle sequence. Hence by using the divided clock signal, the last serial bit transmitted is clocked in after every twenty-four bits during an initialise sequence to achieve the token bit sequence shown in FIG. 5(f). Hence during the initialise token transmission, the output of the selector 109 is output through buffers 105 and 106 onto the buses 52 and 53 respectively, and these bits TS0-11 will be clocked into the parallel-to-serial converter 22 on two successive clock edges of the transmit token clock TX TOKEN CLOCK before the values TS0-11 change.

An additional feature of the parallel to 3-of-6 encoder 21 is the parity check circuit 110. This circuit takes in the parity bit TDP on line 42 corresponding to the data TD0-7 on lines 41 which are also inputted to the circuit 110. The circuit 110 also inputs the transmit token clock TX TOKEN CLOCK on line 50, the DATA SENT signal on line 84 and the TERM SENT signal on line 85. It is envisaged that this circuit 110 may be incorporated to provide a parity check on the eight data bits TD0-7 of the transmit parallel token before being encoded into 3-of-6 format. A detailed explanation of the parity check involved is omitted here, as such a check can be implemented in a manner which can be readily determined by a skilled person. In the event of an invalid check the parity check circuit 110 outputs a signal TX ERROR on line 51 which is sent to the master control circuit 26.

The 3-of-6 encoders 100, 101, 102 each comprise a series of logic gates to implement the logic equations shown in Table 2. The six symbol output bits are generated by logically manipulating the four data-strobe input bits, according to Table 1.

The parallel-to-serial converter 22 used to convert the 3-of-6 symbol bits TS0-11 which are output from the encoder 21 in parallel to a format suitable for serial transmission is shown in FIG. 12. The parallel to serial conversion is consistently little-endian. The parallel to serial converter 22 receives the fast clock signal 54 TX CLOCK generated in this embodiment from an external source, operating at a frequency to match that required for serial transmission.

This clock signal TX CLOCK is fed into the divider 159 which is a divide by twelve unit to generate the transmit token clock TX TOKEN CLOCK 50 which is used as described above. The transmit token clock TX TOKEN CLOCK clocks in the parallel data symbol bits TS0-11 on lines 52 and 53 from the encoder 21 to a shift register 158 in parallel. These are then read out serially under the control of the fast clock TX CLOCK on line 54. The output serial data TX DATA on line 12 then goes into the optical electrical transceiver 16 after which is appears on link 18a in a form suitable for transmission on an optical fibre link.

Figure 13:
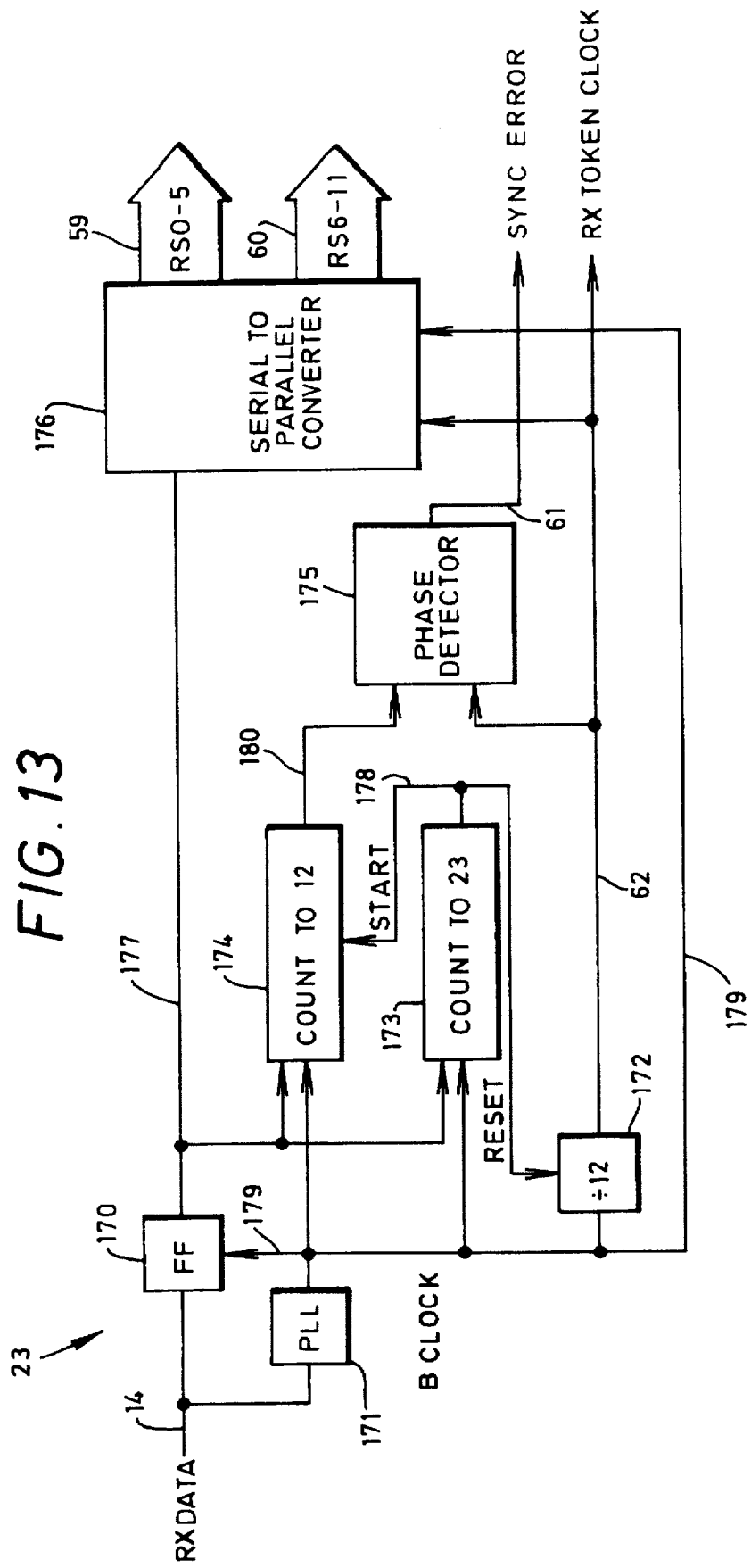
FIG. 13 is a circuit diagram of a converter and clock receiving unit.

Reference will now be made to FIG. 13 to describe the converter and clock receiving unit 23. The incoming serial bits RX DATA on line 14 are fed sequentially into a flip-flop 170 and also to the input of a phase lock loop (PLL) 171. The PLL 171 uses the input on line 14 to reconstruct a bit clock BCLOCK on line 179, the frequency of which is twice that of the bit cycle time of the incoming data and which has a single rising edge in each bit position. The bit clock generated by the PLL is used to clock the flip-flop. The flip-flop will clock, on every rising edge of the bit clock, the next input bit on line 14. Phase lock loops which operate to recover a clock from a serial transmission are known in the art and so this is not described further herein. Hence the flip-flop 170 clocked by the bit clock achieves bit synchronisation of the received serial data. The bit clock is also used to clock two counters; a twelve bit counter 174 and a twenty-three bit counter 173, and a divide by 12 unit 172. The counters 173,174 also receive as inputs the output 177 of the flip-flop 170. The twenty-three bit counter 173 counts successive transitions (i.e., changes between logic zero and logic one) in the data bit stream on line 177. If a count of twenty-three is obtained its output on line 178 will go high. As explained above twenty-three successive transitions on the received bit stream 177 in 3-of-6 encoded format will only occur if an initialise sequence as shown in FIG. 5(f) is being received. The bit clock input to the counters 173 and 174 is used by the counters to indicate where the next bit is supposed to be and therefore to control counting in synchronism with the bits. If no transition occurs between bits the counters reset themselves. Hence, since an initialise token begins with a control symbol there is no transition at the beginning of an initialise token and the counters are reset.

The end of 23 transitions marks the end of the initialise token and so this is therefore the correct place to start the divide by 12 circuit 172 which produces the token clock. Each initialise token resets the token clock, so it only actually starts running after a sequence of initialise tokens has finished. When the counter 178 has reached a successive count of twenty-three it acknowledges receipt of an initialise token by setting its output high and thereby resetting the counter 174 and the divide by 12 unit 172 as well as itself. The divide by 12 unit 172 divides the bit clock from the PLL 171 to generate a receive token clock signal RX TOKEN CLOCK on line 62 which will have a rising edge on the boundary of every two symbols, i.e., a rising edge for every received token.

The counter 174 is used to check token synchronisation by detecting idle tokens. On receiving the signal 178 from the count to 23 counter 173, the count to 12 counter 174 starts to count successive transitions. The counter 174 will not start its count until it has received a signal from the counter 173 indicating that initialisation has occurred. If the count to 12 counter 174 receives eight successive transitions it will determine that it is in receipt of a control symbol since any data symbol sequence of eight or more transitions is illegal. It will therefore continue to count to twelve, and if it reaches twelve will set its output on line 180 high indicating an idle token has been received.

The output on line 180 forms one input to a phase detector 175. The output from count to 23 counter 173 on reaching a twenty-three count will also reset the divide by 12 unit 172. The output of the divide by 12 unit 172 is fed on line 62 as a second input to the phase detector 175. The purpose of the phase detector 175 is to detect a loss of token synchronisation between the input serial data 177 and the receive token clock RX TOKEN CLOCK on line 62. This synchronisation will have been achieved by the counter 173 resetting the divider 172 at the end of an initialise token.

When the phase detector detects a rising edge on its input from the line 180 indicating the twelve successive transitions of a control token, it will check for a simultaneous transition on the input from the line 62. If the transition does not occur simultaneously, the phase detector 175 will output an error signal on line 61, SYNC ERROR, indicating that token synchronisation has been lost. This synchronisation scheme takes advantage of all tokens being the same length. If the tokens were of variable length a regular token clock would not correctly mark the token boundaries. The control tokens are chosen so that the positions where transitions do and do not occur are precisely specified.

Hence both bit and token synchronisation are achieved. Recovery from loss of symbol or token synchronisation is implementation dependent. The simplest is to re-initialise. In some circumstances it may be possible to re-establish synchronisation with the incoming data stream, and to discard only those packets affected by the loss of synchronisation.

The serial to parallel converter 176 has data clocked in serial format on line 177 by the bit clock BCLOCK on line 179, and data is clocked out in the form of two 3-of-6 symbols RS0–5, RS6–11 in parallel on buses 59 and 60 by the slower receive token clock RX TOKEN CLOCK on line 62.

Figure 14A:
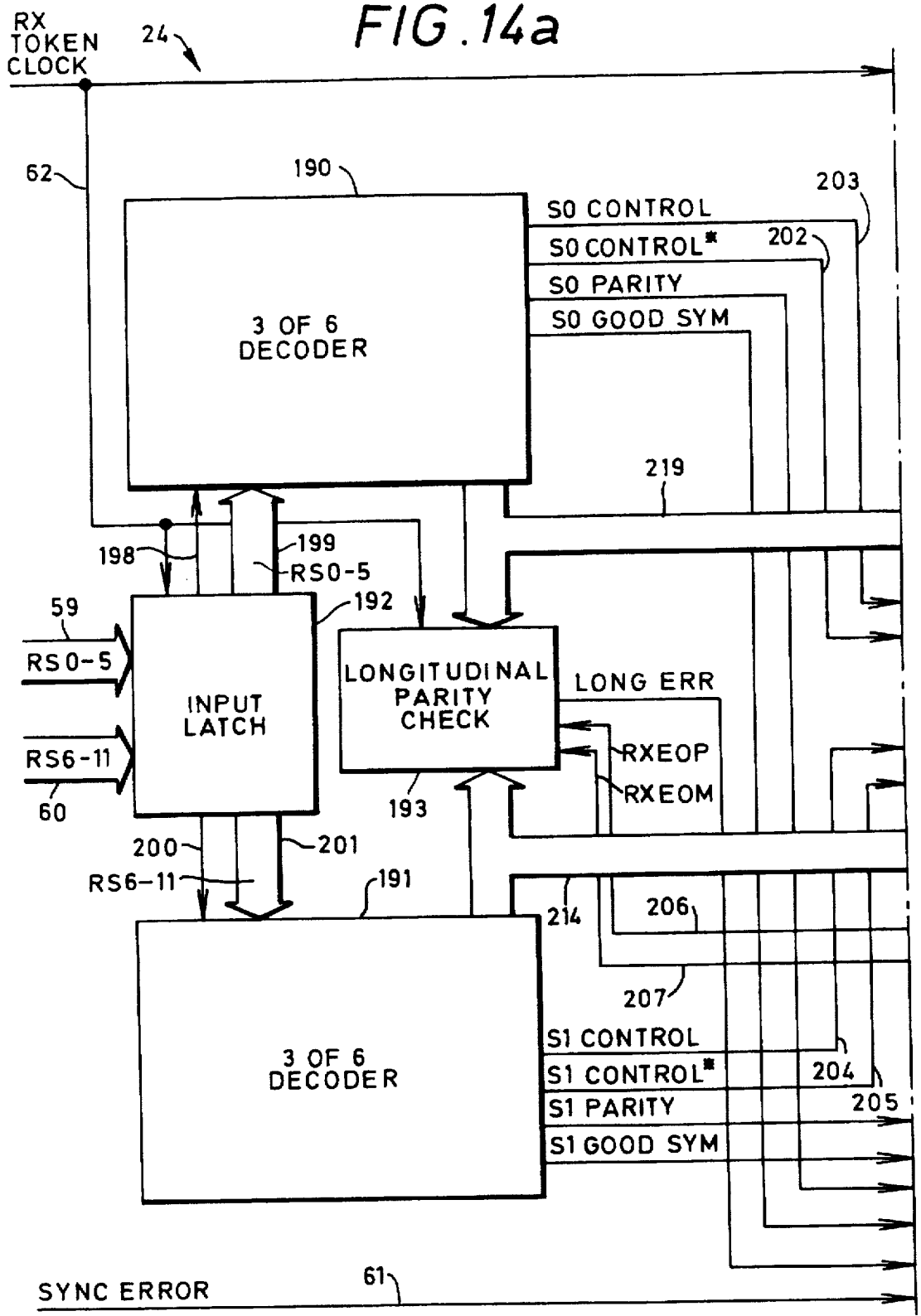
FIGS. 14a and 14b are a circuit diagram of a receive decode circuit.
Figure 14B:
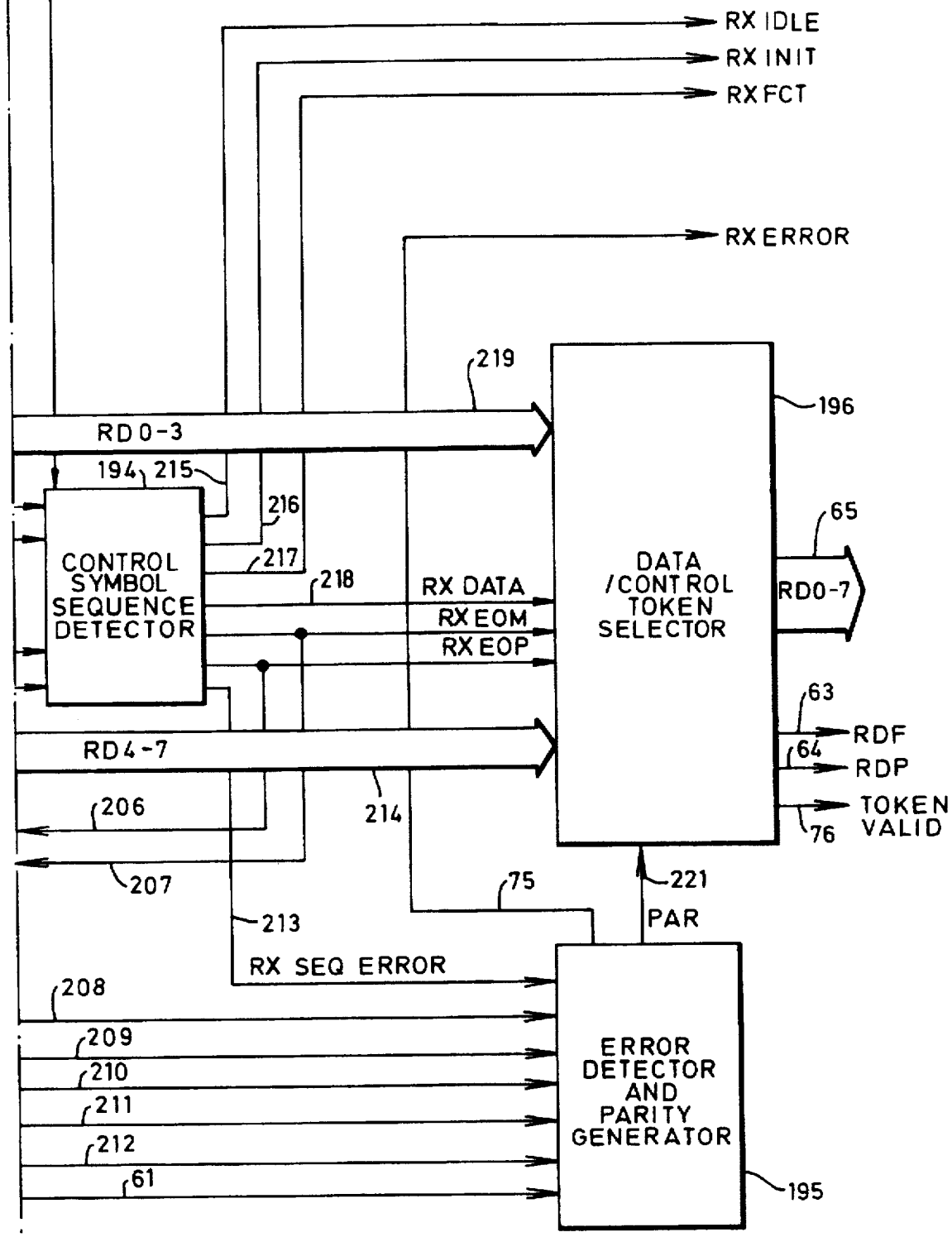

The decoder 24 will now be described in detail with reference to FIG. 14. The decoder 24 receives the symbol data bits RS0–11 on the buses 59 and 60 at an input latch 192. The operation of this input latch will be described with reference to FIG. 15. The input bits RS0–5 and RS6–11 are presented to latches 230 and 231 respectively. In order that control and control* symbols may be decoded correctly, it is necessary to pass to the symbol decoder not only the six bits of the symbol to be decoded, but also the last bit of the previous symbol received. When a pair of symbols RS0–5 and RS6–11 are presented in parallel, for the most significant symbol RS6–11 the last bit received is recalled by simply presenting the most significant bit RS(i)5 of the first symbol as an input to the second latch 230, and is thus presented as an output from the second latch 231 on line 200 along with the symbol bits RS(i)6–11. The symbol bits RS(i)0–5 need to be fed out of the latch at the output 199 along with the most significant bit RS(i–1)11 of the symbol RS(i–1)0–11 that was presented to the latch 231 on the previous receive token clock RX TOKEN CLOCK cycle. This is achieved by using the same clock signal as that which is used to clock the latches 230, 231 to clock a flip-flop 232. Hence, the value on the output of the flip-flop on line 233 and presented as an input to the latch 230 will be latched onto output line 198 along with the symbol bits RS0–5 on line 199.

The first symbol bits RS0–5 on line 199 are then presented on an RX TOKEN CLOCK clock edge to a first 3-of-6 decoder 190 along with the value of the preceding serially transmitted bit RS(i–1)11 on line 198. Similarly, the bits of the second symbol RS(i)6–11 on lines 201 are presented to a second 3-of-6 decoder 191 along with the value of the preceding serially transmitted bit RS(i)5 on a RX TOKEN CLOCK clock edge. As will now be described with reference to FIG. 16, the identical 3-of-6 decoders 190, 191 both generate a number of outputs.

Figure 16:
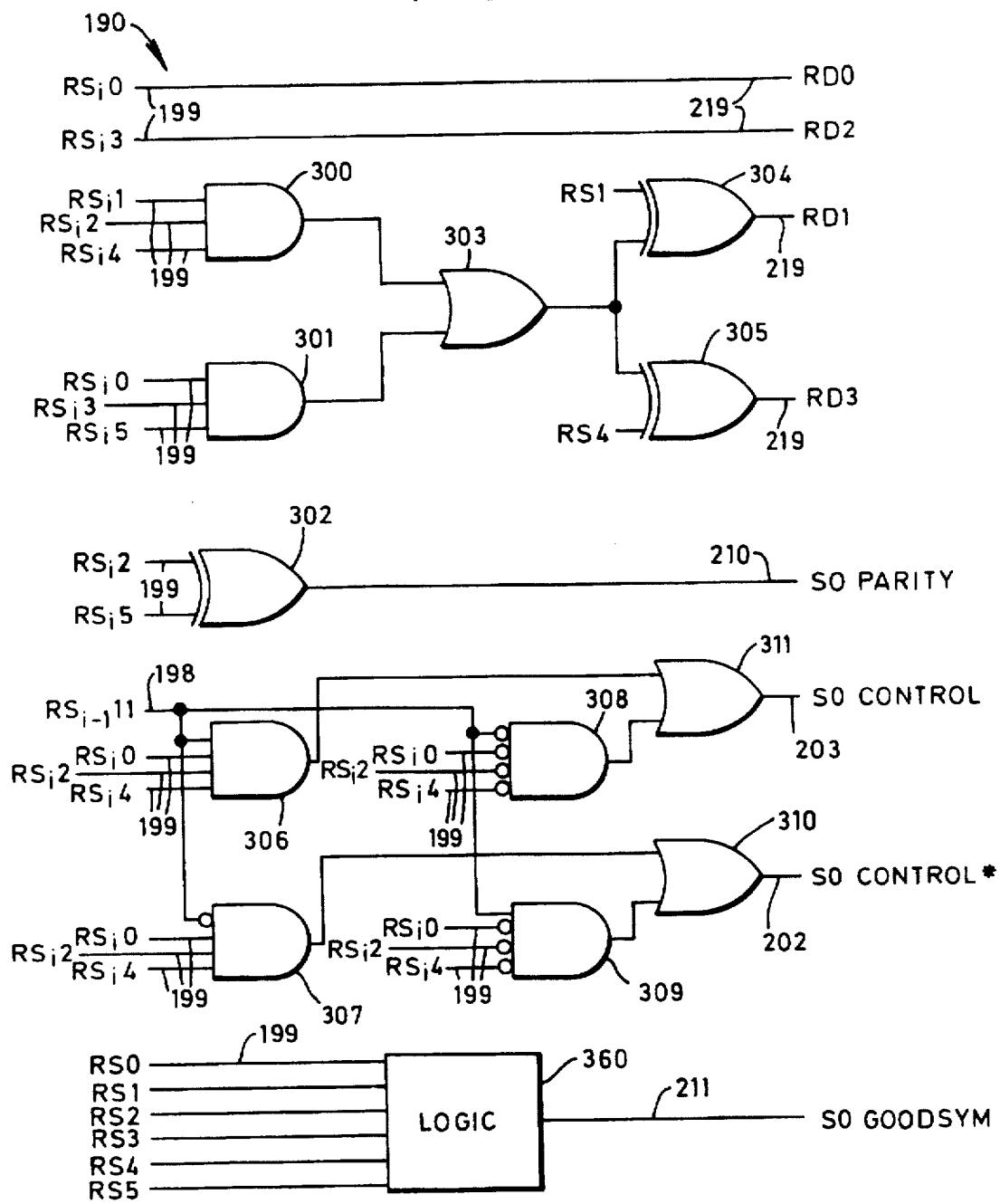
FIG. 16 is a circuit diagram of a 3-of-6 decode used in the receive decode circuit.

FIG. 16 illustrates a 3-of-6 decoder 190, 191. The six input symbol bits RS(i)0–5 on lines 199 are decoded by logic gates 300,301,303–305 to generate four output parallel token bits RD0–RD3 on lines 219 in accordance with the logic equations given to implement Table 1. The bits RS2 and RS5 are further fed through an exclusive OR gate 302 to generate a parity bit S0 PARITY. Logic gates 306–311 use the bits RS0, 2, 4 plus the bit RS(i–1)11 on line 198 (which represents the last bit received before the present RS(i)0) to detect either a control symbol or control* symbol, the presence of which is indicated on lines 203 and 202 respectively.

Referring again to FIG. 14 the 3-of-6 decoders 190, 191 generate parallel bits RD0–3 on bus 219 and RD4–7 on bus 214 respectively. The bits RD0–7 on buses 214 and 219 are supplied to a longitudinal parity check circuit 193 and a data/control token selector 196.

Figure 17:
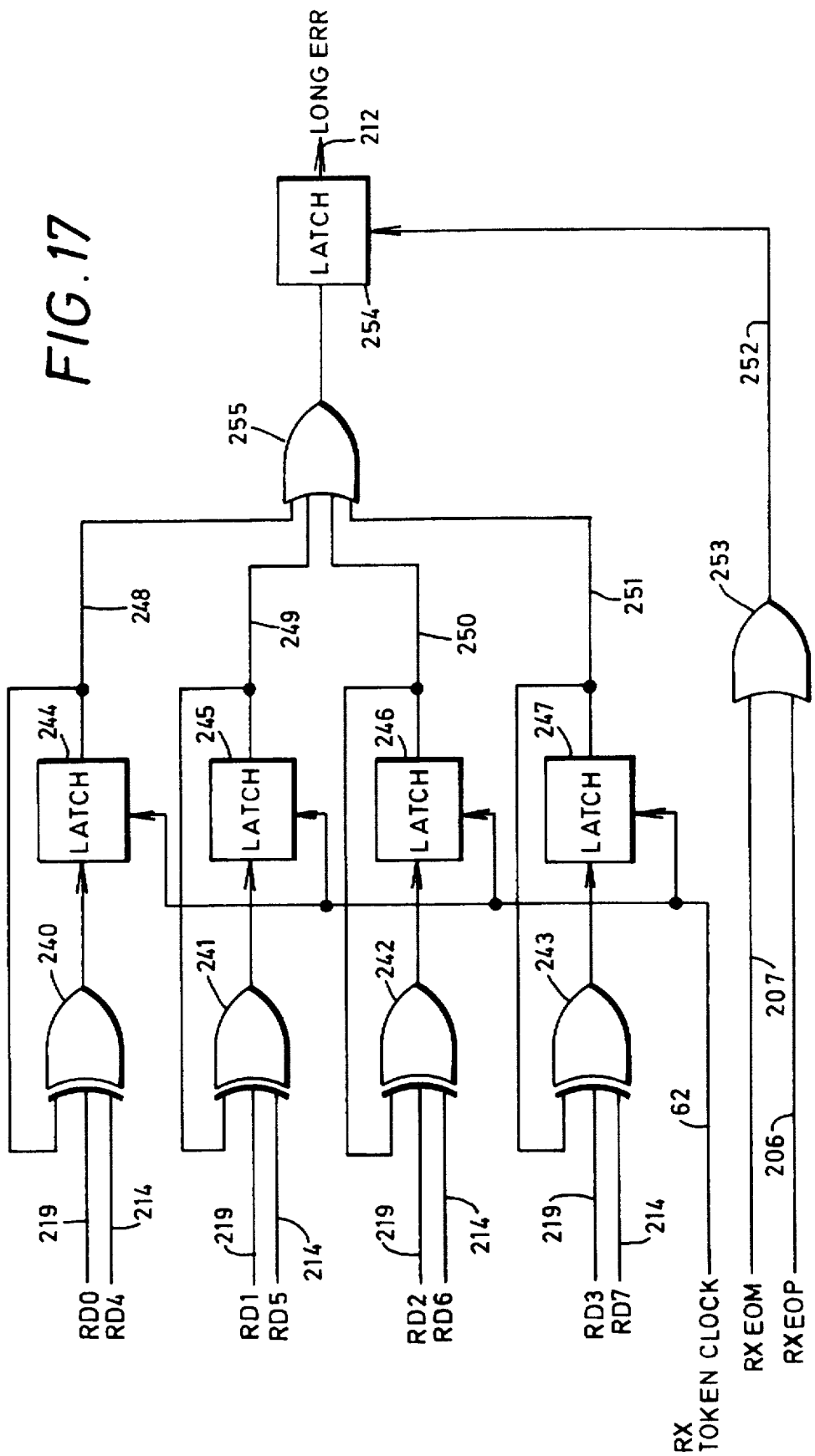
FIG. 17 is a circuit diagram of a longitudinal parity check circuit.
Figure 18:
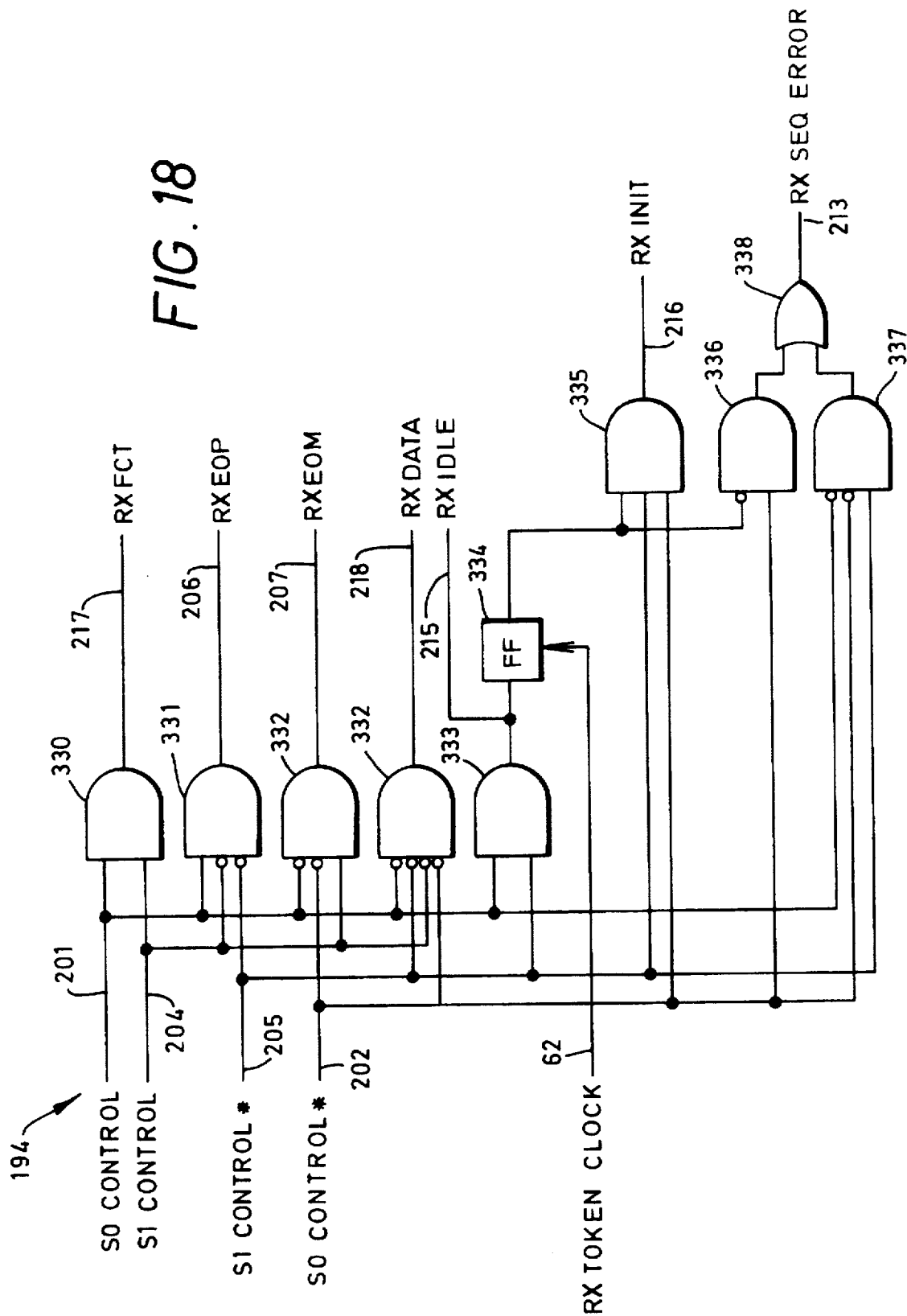
FIG. 18 is a logic gate arrangement for implementing a control symbol sequence detector.

The longitudinal parity check circuit 193 also receives inputs RX EOM and RX EOP on lines 207 and 206 respectively from a control symbol sequence detector circuit 194. The operation of the control symbol sequence detector circuit will be described in detail later with reference to FIG. 18. The operation of the longitudinal parity check circuit 193 is essentially the same as the longitudinal parity generator circuit 80 described previously with reference to FIG. 12 but will now be described with reference to FIG. 17. Exclusive OR gates 240–243 and latches 244–247 combine to provide a running sum of the bits received at their outputs 248–249, a new sum being calculated for every receive token clock RX TOKEN CLOCK cycle. The signals RX EOM and RX EOP are fed into an OR gate 253, the output 252 of which is used to latch a latch 254. Hence whenever a terminator token is received the input of the latch 254 is latched into the output line 212. The input of the latch 254 is the output of an OR gate 255, whose four inputs are from the latches 244–247. The last value latched into the latches on receipt of a terminator will be the checksum value on one or the other of input lines, RD0–3 on lines 219 or RD4–7 on lines 214, depending on whether the terminator is EOM or EOP. It should be noted that control symbols will also decode to all zero on the data lines 214 and 219 and will therefore not contribute to the checksum. As described previously if no error has occurred during transmission then once the checksum has been added to the accumulated sum of data, the output of each of the latches 240–243 should be zero. Hence if the latch 254 output is high because one of the inputs to the OR gate 255 is high, the signal LONG ERR on line 212 will be high indicating a longitudinal error. This signal on line 212 is then supplied as an input to an error detector and parity generator circuit 195, the operation of which will be described in detail later.

Referring again to FIG. 14, the 3-of-6 decoders 190,191 also generate signals S0 CONTROL, S0 CONTROL* on lines 203, 202 and S1 CONTROL, S1 CONTROL* on lines 204, 205 respectively. These respective signals are set high if the corresponding control or control* symbol is detected by the 3-of-6 decoders 190,191. These signals on lines 202–205 are supplied as inputs to the control symbol sequence detector 194, which will now be described with reference to FIG. 18. The control symbol sequence detector 194 generates a plurality of output signals RX IDLE, RX INIT, RX FCT, TX DATA, RX EOP, RX EOM corresponding to the control symbols available. It further generates a signal RX SEQ ERROR on line 213 which is supplied to the error detector and parity generator circuit 195 when an illegal control sequence occurs. AND gates 330–332 are used to decode the combination of S0 CONTROL, S0 CONTROL*, S1 CONTROL, S1 CONTROL* received simultaneously at the decoders 190 and 191, to generate the signals RX FCT, RX EOP, RX EOM and RX DATA. The signal RX IDLE is decoded by a further AND gate 333. The output of the gate 333 is also clocked into a flip-flop 334 and fed to an AND gate 335. It can be seen from FIG. 5(f) that an initialise token can be reviewed as an idle token followed by two control* tokens. Hence the flip-flop is used to store the results of the previous token decode to be compared with the current token decode to see if an initialise token has been received. Gates 336–338 are used to detect a control sequence error, which will result in the signal RX SEQ ERROR being set active on line 213.

Referring again to FIG. 14 the 3-of-6 decoders 190, 191 also generate signals S0 PARITY and S1 PARITY on lines 210 and 208 respectively. As can be seen from FIG. 16, the signal S0 PARITY is generated by the exclusive OR of signals RS2 and RS5 through gate 265, the output appearing on line 210. The signal S1 PARITY will similarly be the exclusive OR of signals RS8 and RS11 with the output appearing on line 208. The signals S0 PARITY and S1 PARITY are supplied as inputs to the error detector and parity generator circuit 195. The 3-of-6 decoder circuits 190,191 also generate two signals S0 GOOD SYM and S1 GOOD SYM on lines 211 and 209 respectively. As shown in FIG. 16, S0 GOOD SYM is generated by a logic circuit 360, the output of which on line 211 goes high when any of the sixteen legal data symbols or two control symbols are received on the bus 199. The symbols S0 GOOD SYM and S1 GOOD SYM are fed to the error detector and parity generator circuit 195 as confirmation that the symbols received are one of the sixteen valid data symbols or one of the two control symbols. The error detector and parity generator circuit 195 also receives the signal SYNC ERROR as an output from the clock recovery circuit 23. If any one of the seven input signals to the circuit 195 is high, indicating an error, the signal RX ERROR on output line 220 will go high. This can be achieved simply by feeding all seven inputs into an OR gate, the output of which drives line 220. The circuit 195 also serves to generate a parity bit PAR on line 221 the purpose of which will be described later in connection with FIG. 19. The parity bit PAR is generated by feeding the inputs S0 PARITY and S1 PARITY into an exclusive OR gate, and supplying the resultant output along line 221.

Figure 19:
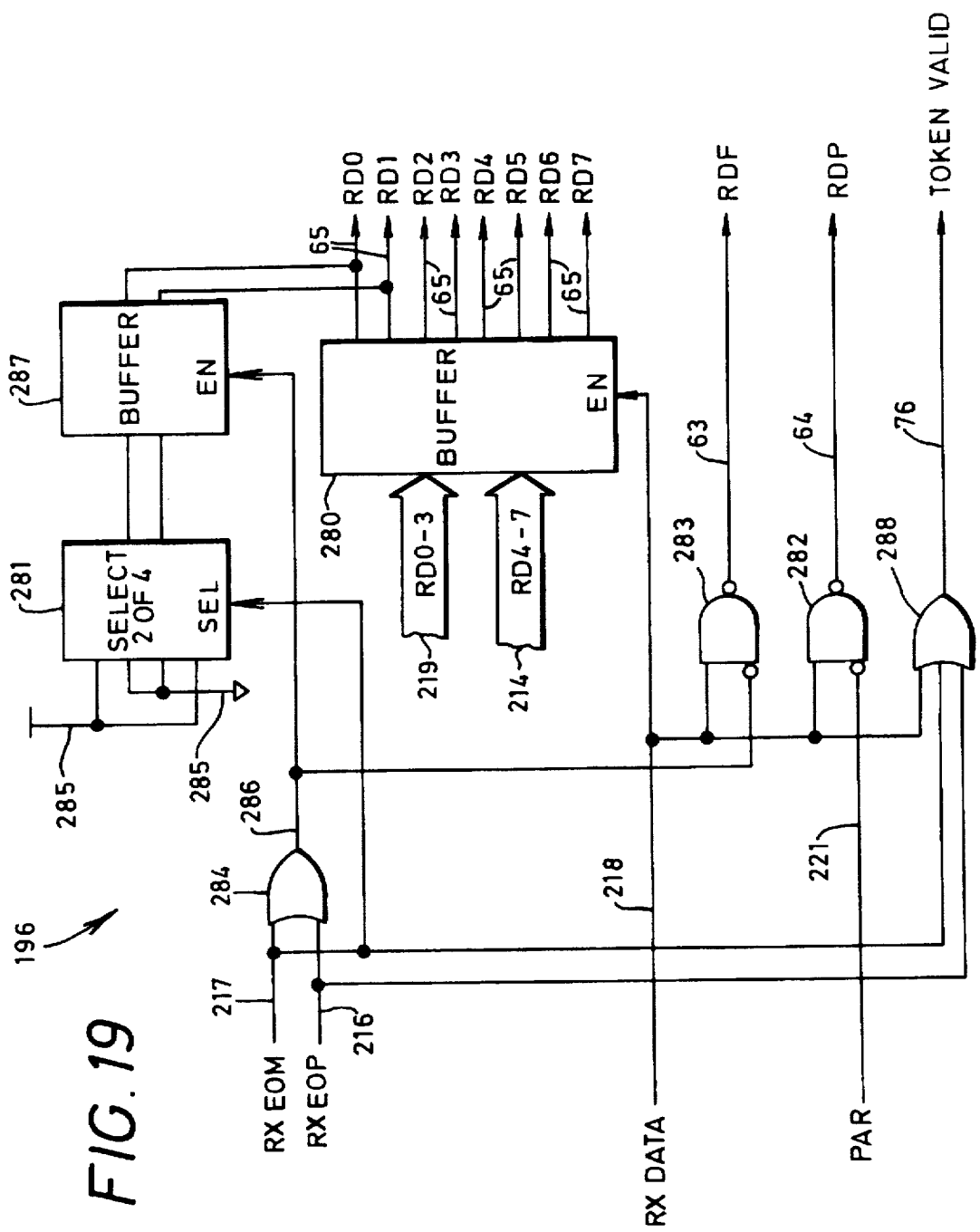
FIG. 19 is a circuit diagram of a token selector.

The signal PAR on line 221 is then fed as an input to the selector 196, the operation of which will now be described in detail with reference to FIG. 19.

The selector 196 has a buffer 280 which receives as inputs the data bits RD0-7 on bus 219 and 214, together with the signals RX DATA, RX EOM, RX EOP and PAR on lines 218, 207, 206, 221 respectively. The data bits RD0-7 on buses 214, 219 are fed to a buffer 280 which is enabled by the signal RX DATA on line 218. Hence, when the control symbol sequence detector 194 indicates that data is being received, the buffer will pass the data RD0-7 to its outputs on lines 65. Further, the signal RX DATA will be high and will therefore cause the output on line 63 RDF of an AND gate 283 to follow its input on line 286. When data is being received the signal on line 286 will be low since the signals RX EOM and RX EOP will be low. Hence the flag bit RDF on line 63 will be set to zero indicating a data token is being outputted. An AND gate 282 will also, when RX DATA is high, have its output RDP on line 64 following its input on line 221. Hence when data tokens are being received the parity bit RDP of the received parallel token will simply be the value PAR output from the parity generator 195 on line 221. It will be recalled that the parity bit of a data-strobe token represents the parity of the data in the previous token plus the flag bit of the present token. The parity bit PAR is not the same as the parity bit that will be contained in the proper data-strobe token outputted by the D-S link interface 29 on line 6. However, it may be used by the D-S link interface to help generate such a parity bit.

When a terminator token is being received, RX DATA will go low, disabling the buffer 280. Either RX EOP or RX EOM on lines 216 and 217 respectively will be high, causing the output of an OR gate 284 to go high on line 286 thus enabling the buffer 287. The select input of a select 2-of-4 unit 281 is connected to the signal EOM on line 217. The outputs of the select 2-of-4 unit can either be 01 or 10, depending on whether RX EOM is high or low. The outputs of the select 2-of-4 unit 281 are connected through the buffer 287 to the two least significant bits RD0,RD1 of the output data token on lines 65. If RX EOM is high when the buffer 287 is enabled the value 01 will appear on bits RD0,RD1 indicating an EOM token, whilst if RX EOM is low whilst the buffer 287 is enabled the value 10 will appear as bits RD0, RD1 indicating an EOP token. The flag bit for a data-strobe control token is always 1. When a terminator token is being received the output of the OR gate 284 will be high, causing the output of the AND gate 283 to be high on line 63., since RX DATA being low means that the AND gate 283 will follow the value of its input on line 286. Hence when a terminator token is being received the flag bit RDF on line 63 will always be high. This enables bit RDF to be set in accordance with the data-strobe protocol to aid the D-S link interface 29 in encoding the data-strobe tokens.

The parity bit PAR generated by the error detector and parity generator 195 when control tokens are being received by the data/control token selector 196 is not required by the D-S link interface 29 to generate data-strobe parity bits. Therefore in the circuit shown in FIG. 19 whenever a control token is being received the signal RDP on line 64 is forced high. Alternatively the gate 282 could be omitted and the signal PAR on line 221 could go directly to the D-S link interface 29, the interface itself deciding when and when not to use the signal PAR.

The RX EOP, RX EOM and RX DATA signals are further fed into an OR gate 288, the output of which, TOKEN VALID on line 76, is used to output a signal to the input FIFO 25, illustrated in FIG. 8, indicating that a valid received parallel token is ready to be read into the input FIFO 25. When the input FIFO 25 reads a TOKEN VALID signal on line 76 in conjunction with a receive token clock RX TOKEN CLOCK on line 62, it will clock in the received parallel token RD0-7 on lines 65 provided there is space in the input FIFO 25.

When the input FIFO 25 has a valid received parallel token stored therein, it presents the data bits RD0-7 on its outputs 72 along with the parity bit RDP on line 73 and the flag bit RDF on line 74. It also presents a signal RX TOK VALID on line 71 to indicate to the data-strobe link interface 29 that it has valid data to be read. When the interface 29 reads the received parallel token it sends an acknowledge signal RX TOK ACK back to the input FIFO 25 on line 70. The input FIFO 25 then makes spaces in its registers for another token from the decoder 24. The signal RX TOK ACK is also provided to the input flow control circuit 28 on line 69. The operation of the input flow control circuit 28 and the output flow control circuit 27 will now be described in detail with reference to FIG. 20.

Whenever a data token or terminator token is output by the encoder 21 a signal is fed on line 40 through a divide by eight unit 320 to an output credit counter 324 in the output flow control circuit 27. The counter 324 has the function of limiting the number of tokens that may be output by encoder 32 until a flow control token has been received by the decoder 24 receiving the output at the other end of the optical link. This prevents the input FIFO 25 in the receiving circuit overflowing due to receipt of too many output tokens. Whenever an FCT is received by the decoder 24 the counter 324 is incremented and after eight tokens sent by the encoder 21 the signal on line 40 causes a decrement of the count in the counter 324. Whenever the counter reaches zero an output is provided on line 47 so as to inhibit further output of data from the encoder 21. In this way, the counter 324 provides an indication of the buffer space available in a receiver at the other end of the optical link and the number of spaces is counted down with each token which is output, and incremented by eight on receipt of an FCT token.

The input FIFO 25 is a store allowing in this example the buffering of eight tokens. To improve bandwidth this buffering may be increased in this example to sixteen tokens. The 3-of-6 coding is designed for longer distance connections than is the data-strobe coding. Such longer distance connection requires more buffering, and it is therefore reasonable to increase the quantum of buffer space that each FCT indicates is available. As, in 3-of-6 coding, control tokens are the same size as data tokens, whereas in data-strobe coding they are half the size (in terms of number of bits), it is reasonable to make the FCT quantum sixteen tokens, instead of the eight tokens used with the data-strobe code.

The FIFO 25 provides an interface with the DS link interface 29 receiving the data bits RD0–7, parity bit RDP and flag bit RDF as well as a RX TOK VALID signal on line 71. Transfer of data from the input FIFO 25 to the DS link interface is effected in a synchronised handshake operation and an acknowledgment signal RX TOK ACK is provided on line 70 to the input FIFO when the DS link interface has received the data. When the DS link interface 29 acknowledges receipt of a token on line 70 this confirms that the input FIFO 25 now has further space by the removal of that token and a signal is provided on line 69 to the input flow control circuit 28. The signal on line 69 passes through a divide by eight unit 321 and is fed to an input credit counter 325. The counter 325 counts tokens as they are input into the DS link interface 29 from the circuit. When eight tokens have been counted by the unit 321 the counter 325 is decremented. This counter 325 has a count-equals-zero detection which supplies a signal on line 49 requesting that a flow control token be sent. The counter 325 also receives an input on line 48 from the encoder 21 to confirm that an FCT token has been sent, thereby increasing the count in the counter 325.

The master control circuit 26 generates the idle and initialise signals. In one embodiment the TX IDLE signal on line 45 from the master control circuit 26 may be tied high, so that idle tokens are always sent whenever no other tokens are requesting to be sent. The master control circuit may also include timing circuitry so that an initialise token is sent at fixed intervals to confirm token synchronisation. In this embodiment an initialise token may be sent every 125 microseconds. On receiving an initialise token the master control circuit can use it for any purpose which is desired for the application. One possible purpose is as a timing reference for ISDN (integrated services digital network) or for other real-time applications which need the same timing reference.

During an initialisation sequence, for instance after power-up, the master control circuit 26 will force the encoder 21 to transmit initialise tokens. After transmitting and receiving initialise tokens for 125 microseconds, the master control circuit will send idle tokens. When the master control circuit has been transmitting and receiving idle tokens for 125 microseconds, it transmits a single initialise token. When the master control circuit has both received and sent a single initialise token, it may send flow control tokens, and no data may be sent by a device until the device has received at least one flow control token.

If a device has been sending idle tokens for more than 375 microseconds, but has not received the initialise and FCT tokens, or has received any token other than idle since the first idle token it received and before the initialise tokens and FCT tokens, it restarts the initialisation sequence.

An externally generated clock is used in preference to a data-strobe clock from the interface in this embodiment. This means that the 3-of-6 encoding circuit will always be operating even when there are no data-strobe tokens to be encoded into 3-of-6 format. However, the circuit could use the data-strobe clock if an external clock source was not available.

What is claimed is:

1. A method of transmitting messages in a message transmission system wherein each message includes data tokens represented by four bit values in a first format, the method comprising the steps of:

receiving at a transmission unit a sequence of said data tokens;

encoding each of said four bit values into a second format being a six-bit symbol having three ones and three zeros, each six-bit symbol being selected out of a set of sixteen six-bit symbols assigned exclusively as data symbols and excluding the symbols 010101 and 101010;

generating control tokens in the second format using the symbols 010101 and 101010 as control symbols; and transmitting a sequence of said six-bit symbols from said transmission unit to a remote receiving unit.

2. A method according to claim 1 wherein a first type of the control symbols is allocated so that its first bit matches the last bit of a preceding symbol and a second type of the control symbols is allocated so that its first bit is the logical inverse of the last bit of a preceding symbol, the method comprising:

combining the first and second types of control symbols to produce a plurality of different control tokens.

3. A method according to claim 2 wherein each message comprises at least one packet in the first format, each packet including data tokens and a terminator token in the form of an end of packet control token, and wherein the end of packet control token comprises a control symbol of the first type followed by a data symbol.

4. A method according to claim 2 wherein each message in the first format includes as a terminator token an end of message control token which in the second format comprises a data symbol followed by a control symbol of the first type.

5. A method according to claim 2 wherein a flow control token for controlling the quantity of data symbols transmitted between two devices comprises a control symbol of the first type followed by another control symbol of the first type.

6. A method according to claim 2 wherein an idle token for transmission when there are no data symbols to be transmitted comprises a control symbol of the first type followed by a control symbol of the second type.

7. A method according to claim 2 wherein an initialise token comprises a control symbol of the first type followed by three control symbols of the second type in succession thereby to provide a sequence of 24 alternating bits.

8. A method according to claim 2 wherein each control token commences with a control symbol of the first type.

9. A method according to claim 8 wherein each message comprises at least one packet in the first format, each packet including data tokens and a terminator token in the form of an end of packet control token, and wherein the end of packet control token comprises a control symbol of the first type followed by a data symbol.

10. A method according to claim 8 wherein each message in the first format includes as a terminator token an end of message control token which in the second format comprises a data symbol followed by a control symbol of the first type.

11. A method according to claim 8 wherein a flow control token for controlling the quantity of data symbols transmitted between two devices comprises a control symbol of the first type followed by another control symbol of the first type.

12. A method according to claim 8 wherein an idle token for transmission when there are no data symbols to be transmitted comprises a control symbol of the first type followed by a control symbol of the second type.

13. A method according to claim 8 wherein an initialise token comprises a control symbol of the first type followed by three control symbols of the second type in succession thereby to provide a sequence of 24 alternating bits.

14. Data transmission circuitry comprising:

input circuitry for receiving messages in a first format including data tokens represented by four bit values;

encoding circuitry for encoding each four bit value as a six-bit symbol having three ones and three zeros, each symbol being selected out of a set of sixteen symbols uniquely assigned as data symbols and excluding the symbols 010101 and 101010 and for generating control tokens using the symbols 010101 and 101010; and output circuitry for transmitting the encoded data symbols and generated control tokens.

15. Data transmission circuitry according to claim 14 wherein the input circuitry comprises a buffer arranged to receive bits of an incoming token in parallel, the encoding circuitry providing for each incoming token two six-bit symbols and outputting the bits of these symbols in parallel and the output circuitry comprising a parallel to serial converter for transmitting the bits of the encoded symbols serially.

16. Data transmission circuitry according to claim 15 in which the output circuitry includes circuitry capable of outputting selectively one of two terminator tokens, a first terminator token being a control symbol followed by a data symbol and a second terminator being a data symbol followed by a control symbol.

17. In a message transmission system, a method of processing messages to increase the speed of transmission through a transmission path, each message including at least one data token represented by a four bit value, the method comprising the steps of:

replacing each four bit value with a six bit symbol having three ones and three zeros, each six bit symbol being selected out of a set of sixteen symbols defined as data symbols, the data symbols excluding the 010101 and 101010 symbols which are defined as control symbols;

generating at least one control token using the control symbols; and transmitting through the transmission path the six bit symbol and the control token.

18. A data transmission circuitry for encoding messages to increase the speed of transmission through a transmission path, comprising:

an input circuitry for receiving messages, each message including data tokens with each data token being represented by a four bit value;

an encoding circuitry connected to the input circuitry and operable to encode each four bit value as a six bit symbol having three ones and three zeros, each six bit symbol being selected out of a set of sixteen symbols defined as data symbols, the data symbols excluding the 010101 and 101010 symbols which are defined as control symbols, the encoding circuitry operable to generate control tokens using the control symbols; and an output circuitry connected to the encoding circuitry and operable to transmit the encoded data symbols and the control tokens through the transmission path.

19. An interface comprising data transmission circuitry and data receiving circuitry, wherein the data transmission circuitry comprises:

input circuitry for receiving messages in a first format including data tokens represented by four bit values and terminator tokens;

encoding circuitry for encoding each four bit value as a six-bit symbol having three ones and three zeros, each symbol being selected out of a set of sixteen symbols uniquely assigned as data symbols and excluding the symbols 010101 and 101010 and for generating control tokens using the excluded symbols 010101 and 101010; and output circuitry for transmitting the encoded data symbols and generated control tokens;

and wherein the data receiving circuitry includes a synchronization detection circuit comprising:

a clock generator connected to receive an incoming stream of bits and to generate therefrom a bit clock having a clock edge defining each bit position in the bit stream;

a counter arranged to receive the incoming bit stream and the bit clock and to count the number of successive transitions in the incoming bit stream and to provide a first output signal when the count is twelve;

a clock divider for dividing the bit clock by twelve to produce a second output signal every twelfth clock edge; and a phase detector for comparing said first and second output signals and for providing an error signal when they are out of phase.

* * * * *